United States Patent [19]

Kato et al.

[11] Patent Number: 4,917,557

[45] Date of Patent: Apr. 17, 1990

[54] DOUBLE-DECKED, AUTOMOBILE LOADING APPARATUS, AND METHOD OF USING THE SAME

[75] Inventors: Fusao Kato, Kurashiki; Yoshio Umezu, Tokyo, both of Japan

[73] Assignees: Mitsubishi Jidosha Kogyo Kabushiki Kaisha, Tokyo; Kabushiki Kaisha Marubun, Okayama, both of Japan

[21] Appl. No.: 110,692

[22] PCT Filed: May 7, 1987

[86] PCT No.: PCT/JP87/00279
§ 371 Date: Sep. 22, 1987
§ 102(e) Date: Sep. 22, 1987

[87] PCT Pub. No.: WO87/06895
PCT Pub. Date: Nov. 19, 1987

[30] Foreign Application Priority Data

May 7, 1986 [JP] Japan ................................. 61-104530
Dec. 4, 1986 [JP] Japan ................................. 61-289655

[51] Int. Cl.⁴ ............................................ E04H 6/06
[52] U.S. Cl. .................... 414/229; 414/608; 414/399; 414/392; 296/1.1; 298/17 B; 108/53.1; 108/54.1; 108/56.1; 108/55.5; 410/12; 410/13; 410/24; 410/26
[58] Field of Search .............. 414/607, 608, 255, 256, 414/258, 228, 229, 230, 399, 400, 392; 296/1.1; 298/17 B; 108/53.1, 54.1, 56.1, 55.5; 410/3-29.1

[56] References Cited

U.S. PATENT DOCUMENTS

| 1,797,294 | 3/1931 | McMullen | 410/13 |
| 2,906,405 | 9/1959 | Erickson | 414/608 X |
| 3,378,157 | 4/1968 | James | 414/607 |
| 3,618,796 | 11/1971 | Reisner | 414/399 X |
| 3,675,795 | 7/1972 | Dluhy | 410/24 X |
| 4,229,131 | 10/1980 | Hague | 410/12 |
| 4,369,009 | 1/1983 | Fulford | 410/12 X |

FOREIGN PATENT DOCUMENTS

| 952375 | 8/1974 | Canada | 410/6 |
| 1052909 | 3/1959 | Fed. Rep. of Germany | 410/26 |
| 1480147 | 9/1969 | Fed. Rep. of Germany | 298/17 B |
| 18673 | 2/1977 | Japan | 414/229 |
| 4584 | 1/1981 | Japan . | |
| 183325 | 10/1983 | Japan . | |
| 8101997 | 7/1981 | PCT Int'l Appl. | 410/24 |

Primary Examiner—Frank E. Werner
Attorney, Agent, or Firm—Hedman, Gibson, Costigan & Hoare

[57] ABSTRACT

A double-decked apparatus has a base (4), and a movable deck (6) is rotatably connected, at one end, to one end of the base. Automobiles can be positioned on the base (4) and on the movable deck (6). The movable deck can rotate between a first position, where it is laid upon the base and positioned substantially parallel thereto, and a second position, where it is inclined upwardly. The apparatus is also provided with support rods (8, 9) which can hold the movable deck in the second position. Two automobiles can be mounted on this apparatus, one above the other. The apparatus can, therefore, help to achieve an efficient use of the space within a transport container.

15 Claims, 30 Drawing Sheets

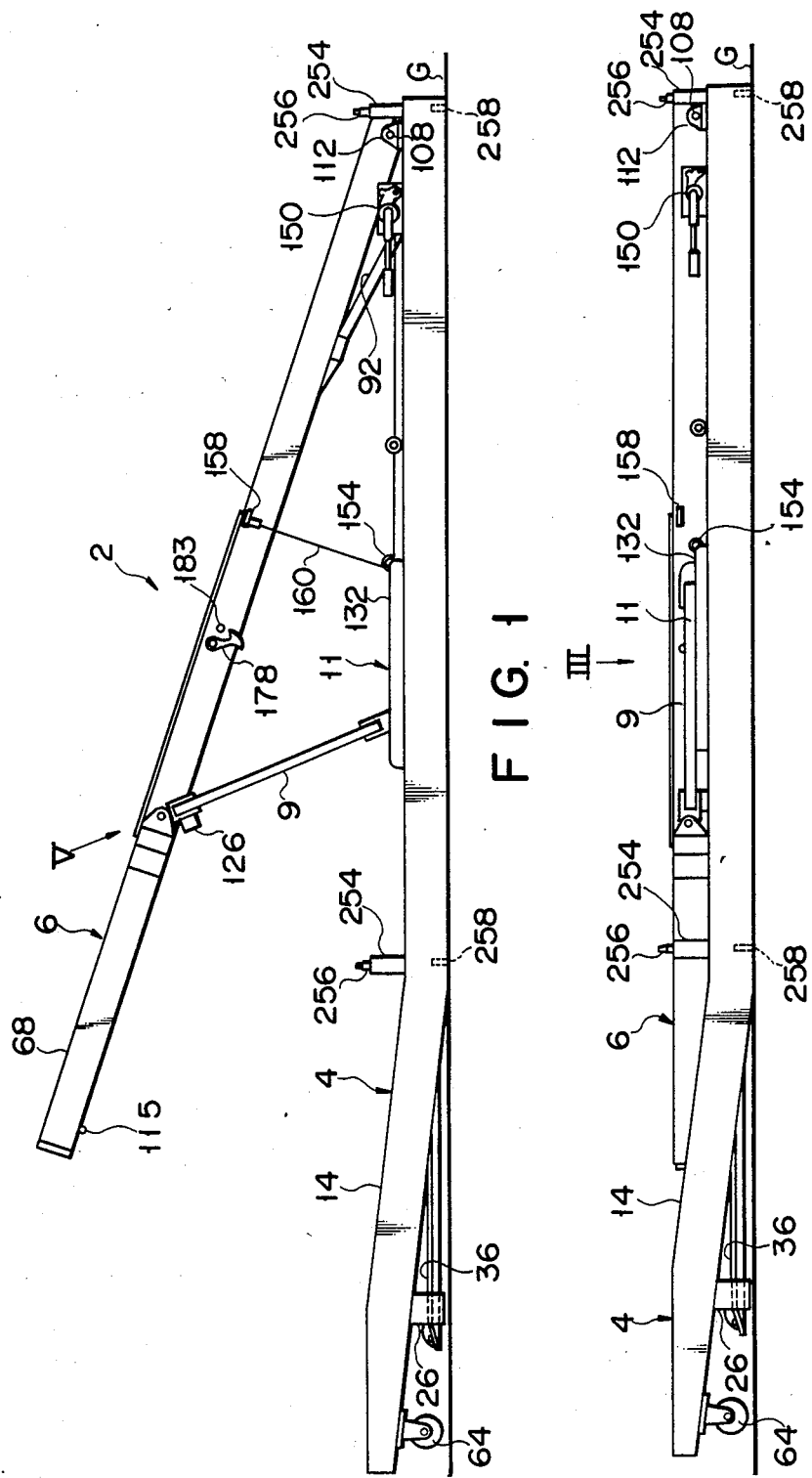

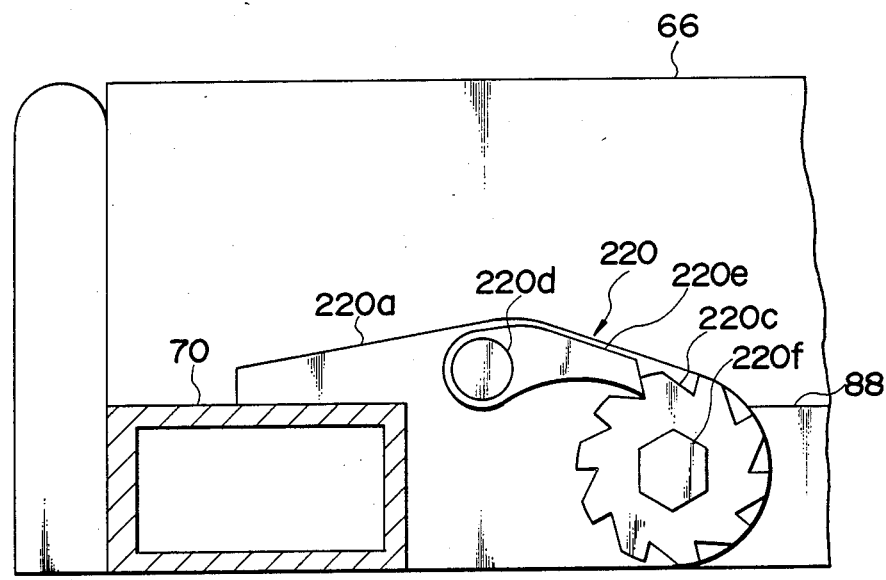
F I G. 20
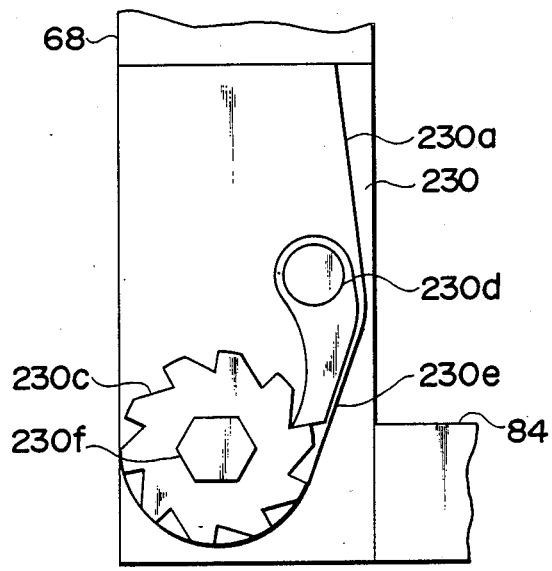
F I G. 21

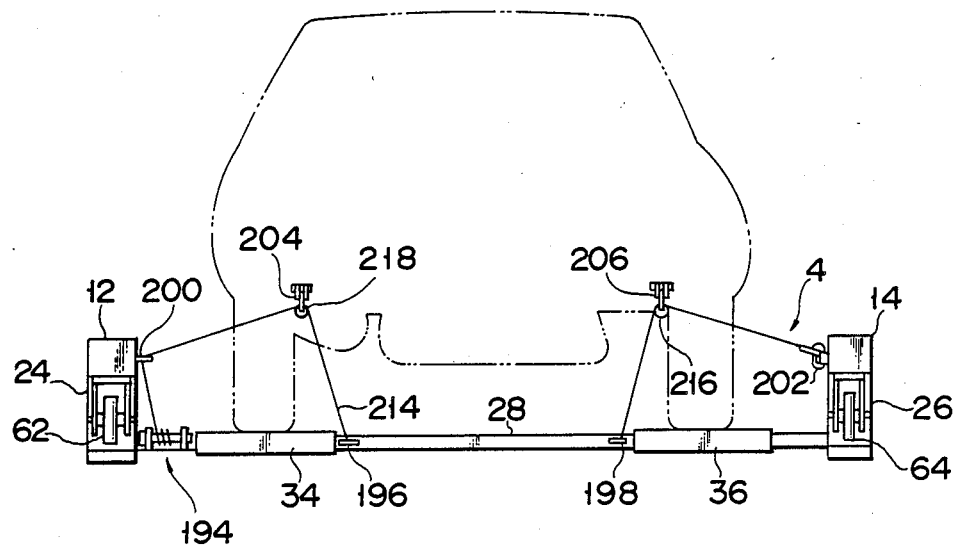
F I G. 26
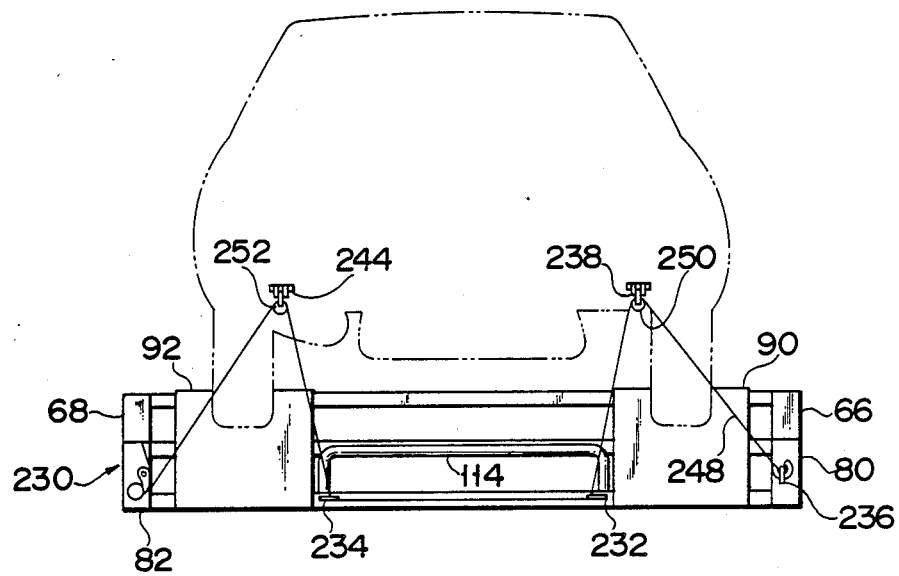
F I G. 27

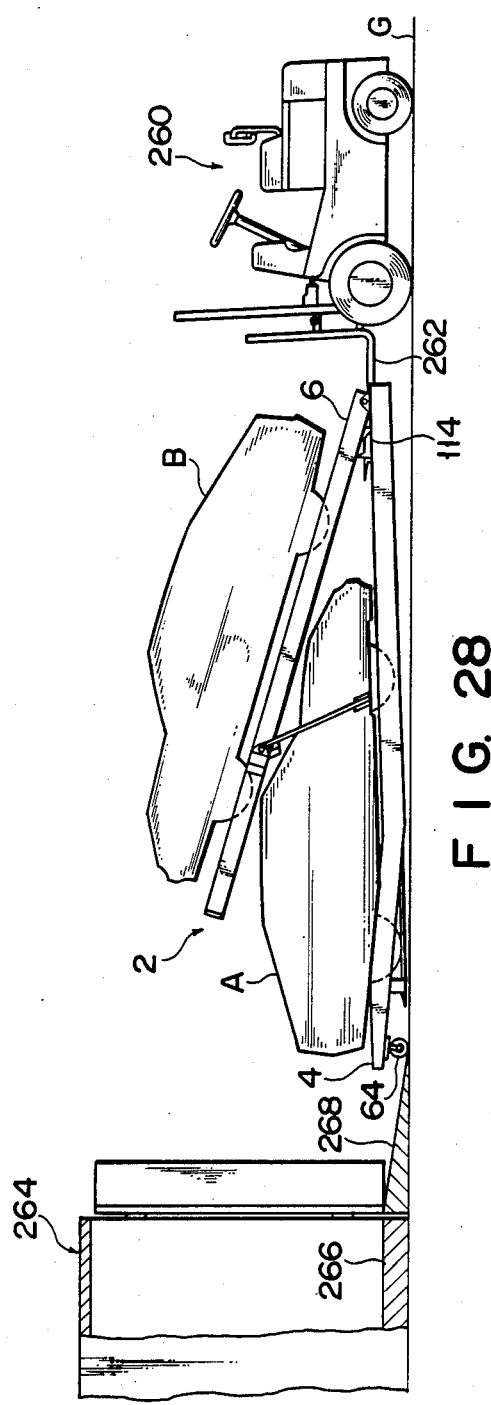
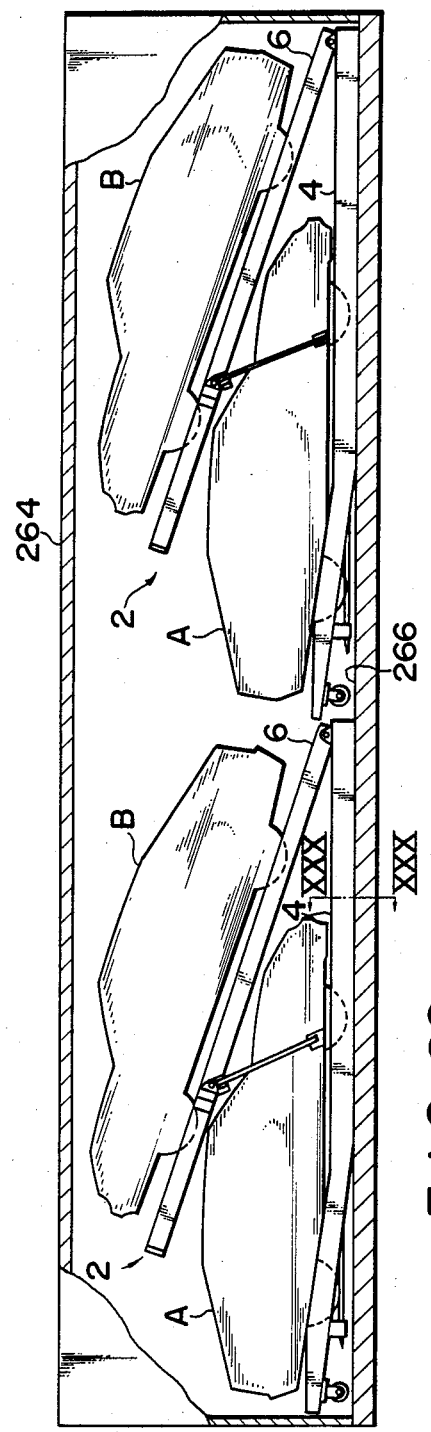
FIG. 28
FIG. 29

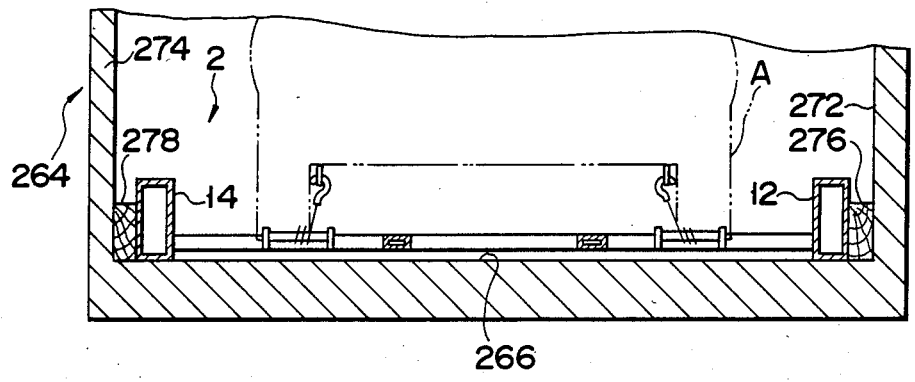
F I G. 30
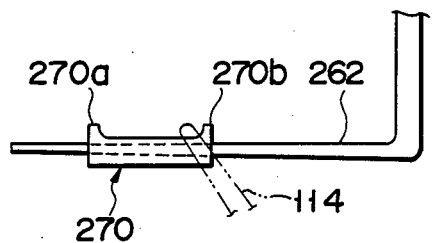
F I G. 31

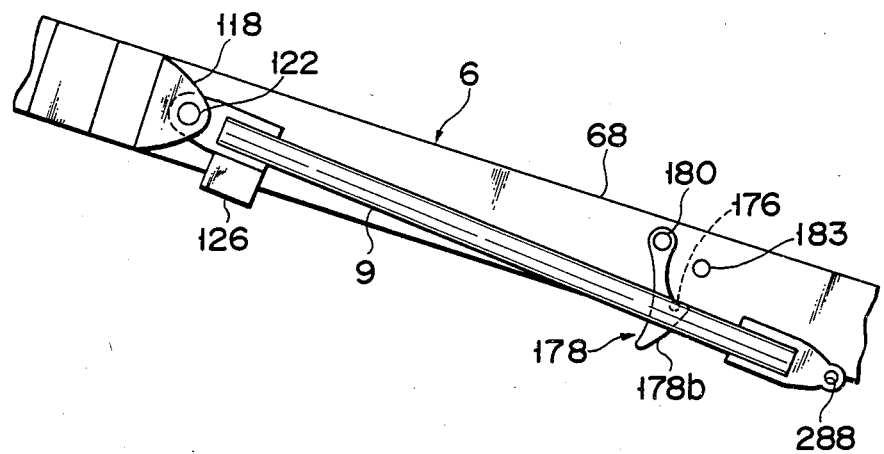
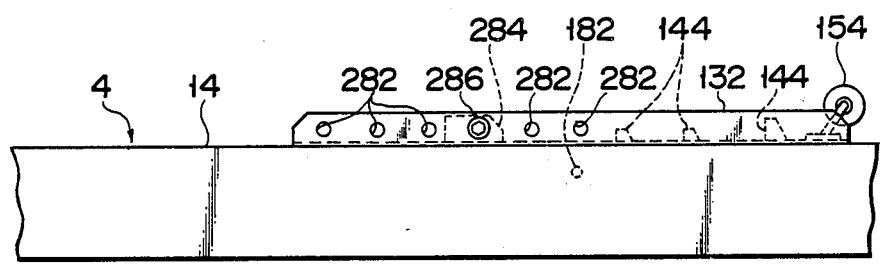
F I G. 34

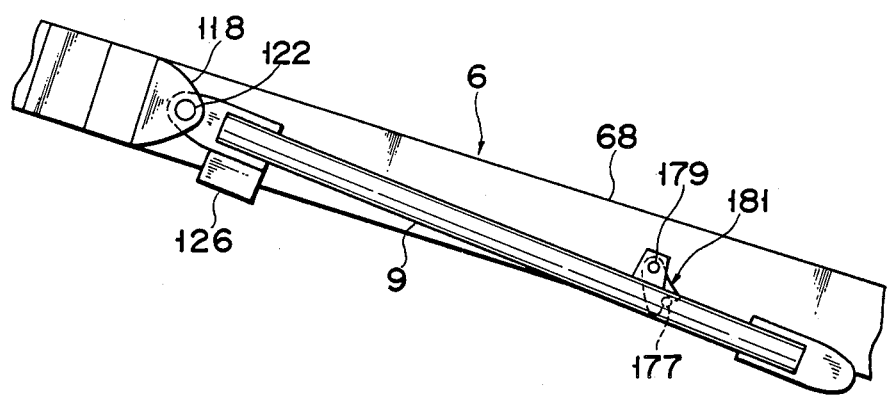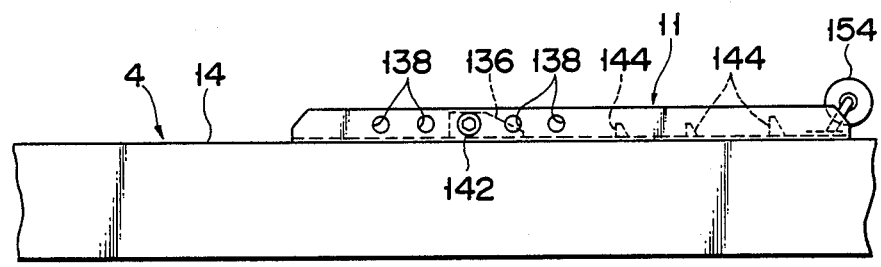
FIG. 36

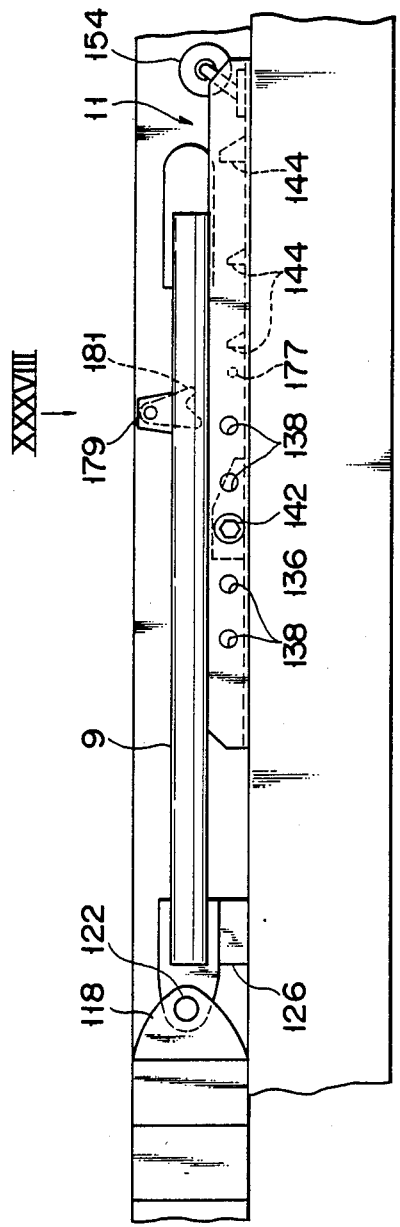
F I G. 37
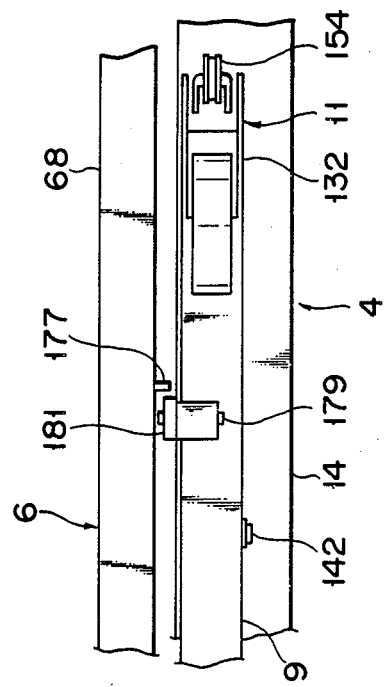
F I G. 38

DOUBLE-DECKED, AUTOMOBILE LOADING APPARATUS, AND METHOD OF USING THE SAME

TECHNICAL FIELD

The present invention relates to an apparatus for loading automobiles into a container, and a method of using this apparatus.

BACKGROUND ART

Hitherto, automobiles have been loaded into a container and positioned horizontally therein, and then transported to their destination. The containers used for transporting automobiles are, for the most part, of a standardized size. Since there is often a large amount of unused space remaining even after the full complement of automobiles has been loaded into the container, the utilization efficiency of the container is, therefore, less than ideal.

The present invention has been developed in order to solve the problem described above. Accordingly, its object is to provide an apparatus for loading automobiles into a container such that the amount of unused space is minimized, and also to provide a method of using the apparatus.

DISCLOSURE OF INVENTION

According to the invention, an apparatus is provided which has a base on which automobiles can be loaded in a substantially horizontal position. A movable deck is rotatably coupled, at one end, to one end of this base. The movable deck can be rotated to a first position, where it is above and substantially parallel to the base, or to a second position, where it is inclined upward in relation to the base. The apparatus further has a support rod which holds the movable deck in the second position.

In the present invention, the aforesaid second position is predetermined such that the movable deck, when set in this position, is parallel to the plane including the front edges of the hood and roof panel of an automobile positioned on the base. The automobile is positioned on the base such that the plane, including the front edges of the hood and roof panel, is close to the movable deck. Another automobile is loaded on the movable deck such that the front of the automobile is at a higher level than the rear. Thus, the apparatus of the invention is advantageous in that, since two automobiles can be loaded in the manner described above, and partly overlap one another, the movable deck set in the second position is almost parallel to, and close to, the plane including the front edges of the hood and roof panel of the automobile positioned on the base. Therefore, the plane including the front edges of the hood and roof panel of the automobile positioned on the movable deck is substantially horizontal. Further, the combined height of the two automobiles stacked, thus is much lower than their total height when stacked one on top of the other, and their combined length is much shorter than their total length when placed end to end. Hence, when the automobiles are loaded into a container, the unused space within the container will be reduced to a minimum. Clearly, the apparatus of the present invention is a considerable improvement over the conventional apparatus. In addition, since the automobile on the base is positioned toward the movable deck, and the automobile on the movable deck is positioned with its front located at a level higher than its rear, all that is necessary, therefore, to load them on the base and movable deck, respectively, is to drive both automobiles forward, no reversing maneuvers being necessary.

The automobiles can be loaded in either of two modes. In the first mode, the movable deck is first of all rotated to the second position. Then, one automobile is driven onto the base, fllowed by another being driven onto the movable deck.

In the second mode, one automobile is first of all loaded on the movable deck set in the first position, the movable deck is then rotated into the second position, and finally, another automobile is loaded on the base. In either mode, both automobiles can be driven to their loading positions, and can thus be easily and accurately positioned on the loading apparatus.

In the loading apparatus of this invention, even if automobiles are small enough to be loaded in a container, with gaps between each other and the inner walls of the container, they can be positioned on the base and deck, respectively, each in the direction opposite to the direction in which it is loaded in the method described above, thereby to enhance the utilization efficiency of the container.

BRIEF DESCRIPTION OF THE DRAWINGS

FIG. 1 is a front view of one embodiment of the present invention.

FIG. 2 is a front view showing the loading apparatus of FIG. 1 in the folded condition.

FIG. 20 is also an enlarged, section view taken along line XX—XX in FIG. 10.

FIG. 21 is an enlarged, sectional view taken along line XXI—XXI in FIG. 11.

FIG. 26 is a diagram explaining how to use the anchoring device (FIG. 23) in another method.

FIG. 27 is a diagram explaining how to use the anchoring device (FIG. 25) in another method.

FIG. 28 is a front view, showing the apparatus, on which automobiles A and B are mounted, being loaded into a container by means of a forklift truck.

FIG. 29 is a sectional view illustrating loading apparatuses 2 loaded within a container.

FIG. 30 is an enlarged, sectional view taken along line XXX—XXX in FIG. 29.

FIG. 31 is an enlarged view showing fork 262 of forklift truck 260 shown in FIG. 28.

FIG. 34 is a front view showing pin 176 of support rod 9, which is fastened to fastening lever 178.

FIG. 36 is a front view showing fastening lever 181 of support rod 9, which is coupled with pin 177 of movable deck 6.

FIG. 37 is a front view showing movable deck 6 laid upon base 4.

FIG. 38 shows base 4 and deck 6 as seen in the direction of arrow XXXVIII (FIG. 37).

BEST MODE OF CARRYING OUT THE INVENTION

Figure 3:
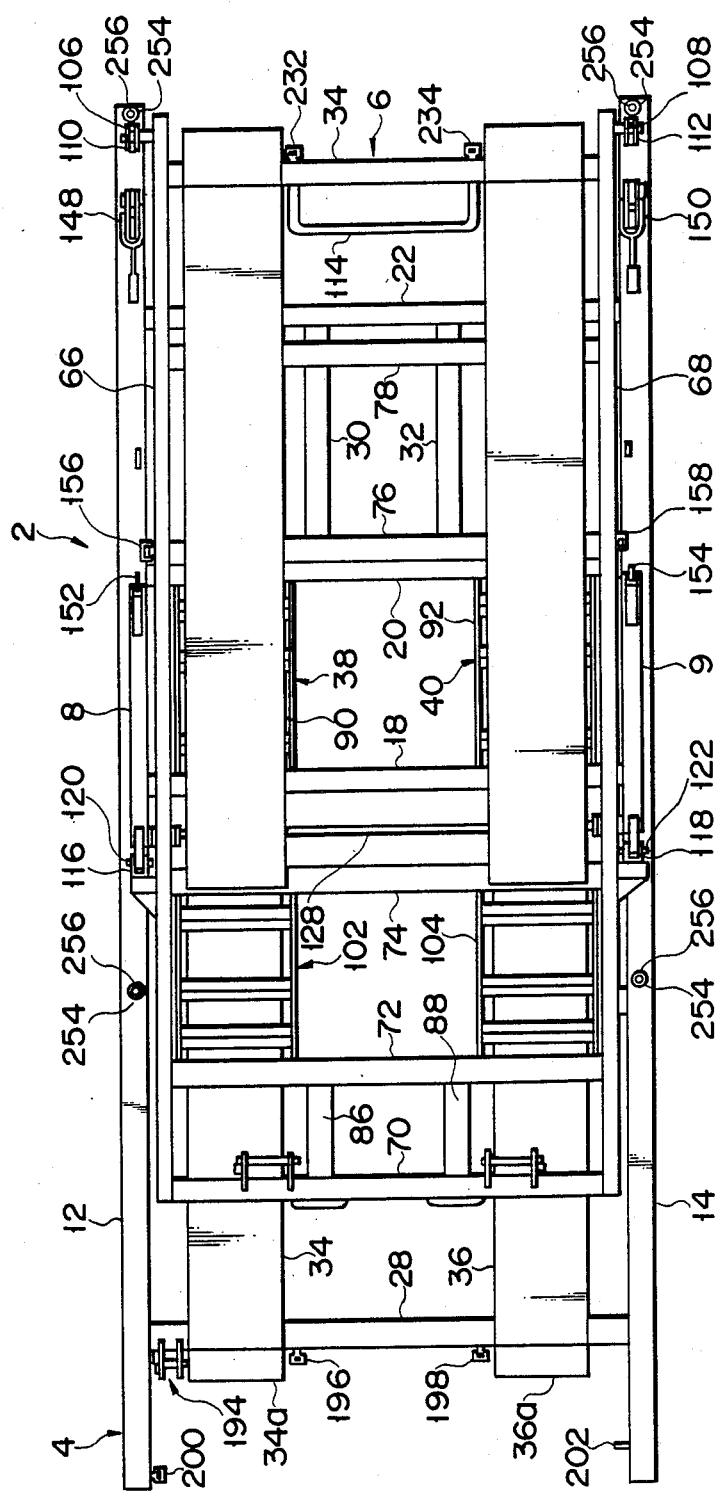
FIG. 3 is a plan view of the apparatus as seen in the direction of arrow III in FIG. 2.

One embodiment of the present invention will now be described in detail, with reference to the accompanying drawings.

Numeral 2 in the drawings designates a loading apparatus according to one embodiment of the invention. Loading apparatus 2 comprises base 4, movable deck 6, support rods 8 and 9, and coupling mechanisms 10 and 11.

As is clearly shown, particularly, in FIGS. 1, 4, 7, 22 and 23, base 4 has longitudinal beams 12 and 14 extending in the lengthwise direction of base 4, and transverse beams 16, 18, 20 and 22 bridging longitudinal beams 12 and 14.

Referring to FIG. 1, the left end portions of longitudinal beams 12 and 14 are bend upwardly away from plane G in which beams 12 and 14 are placed. Brackets 24 and 26 are attached to the lower surfaces of these bent portions, respectively. Transverse beam 28 connects brackets 24 and 26. Auxiliary beams 30 and 32 are interposed between transverse beams 20 and 22. Plates 34 and 36, both extending in the lengthwise direction of base 4, are mounted on and fastened to transverse beams 28, 26 and 18. The wheels of automobile A will be placed on these plates 34 and 36 when automobile A is mounted on base 4. Slopes 34a and 36b are provided on the left end portions of plates 34 and 36, making it easier for automobile A to ride onto base 4.

Figure 8:
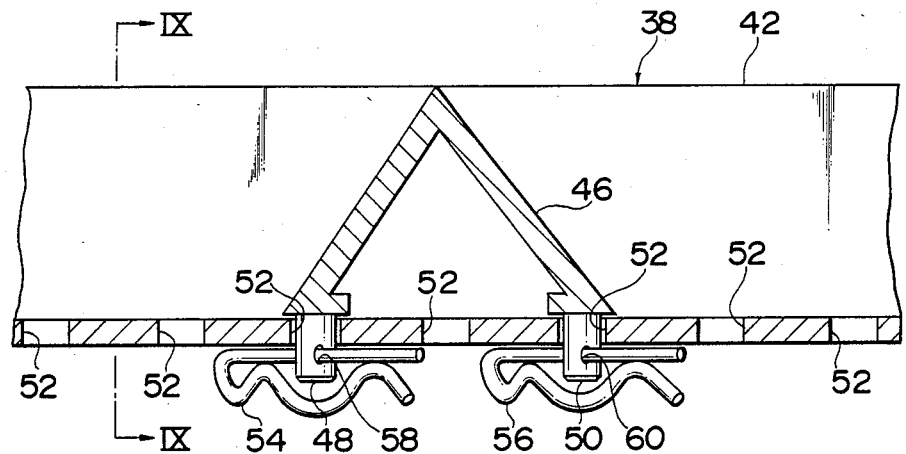
FIG. 8 is an enlarged sectional view of base 4, taken along line VIII—VIII in FIG. 7.
Figure 9:
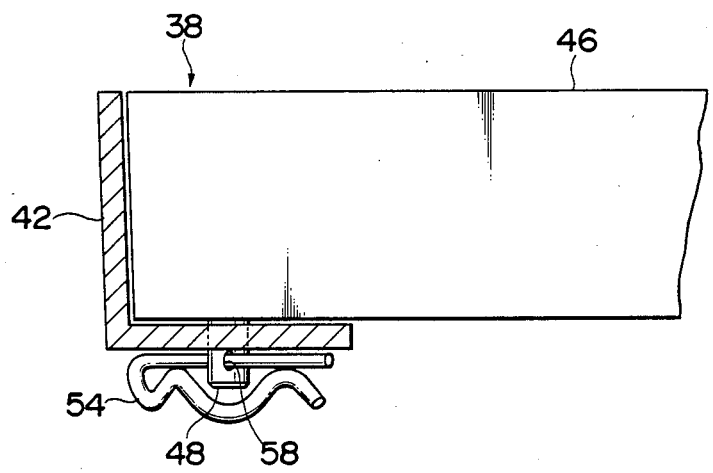
FIG. 9 is a sectional view taken along line IX—IX in FIG. 8.

Wheel stoppers 38 and 40 are connected between transverse beams 18 and 20 in order to hold parts of the wheels of automobile A. Wheel stoppers 38 and 40 are identical in structure, and only wheel stopper 38 will be described. Wheel stopper 38 has beams 42 and 44, and a plurality of bars 46. Beams 42 and 44 have an L-shaped cross section and is connected between transverse beams 18 and 20. Bars 46 extend between beams 42 and 44 such that they define a gap in which the wheel can be fitted. As is clearly understood from FIGS. 8 and 9, each bar 46 has a cross section in the form of an inverted V. Pins 48 and 50 are fastened to the legs of bar 46, and hence extend downwardly therefrom. Holes 52 are cut in beams 42 and 44, and set apart equidistantly in the lengthwise direction of beams 42 and 44. Therefore, by inserting pins 48 and 50 in desired holes 52, the position of bar 46 with respect to beams 42 and 44 can be adjusted. Pins 48 and 50 have holes 58 and 60. Fastening members 54 and 56 pass through these holes 58 and 60, respectively, thus preventing pins 48 and 50 from being pulled out of holes 52. Fastening members 54 and 56 are made of a steel which has such elasticity that they can be detachably inserted into holes 58 and 60, respectively.

As is shown in FIG. 1, wheels 62 and 64 are attached to the lower surfaces of the left end portions of longitudinal beams 12 and 14. These wheels 62 and 64 touches plane G or remains set apart from plane G when base 4 is placed in plane G as is shown in the figure. When the other end portion of base 4 (i.e., the right end portion, in FIG. 1) is lifted a little (for example, by 100 to 200 mm), only wheels 62 and 64 touch plane G, and the lower surface of longitudinal beam 12 or 14 does not touch plane G.

Figure 4:
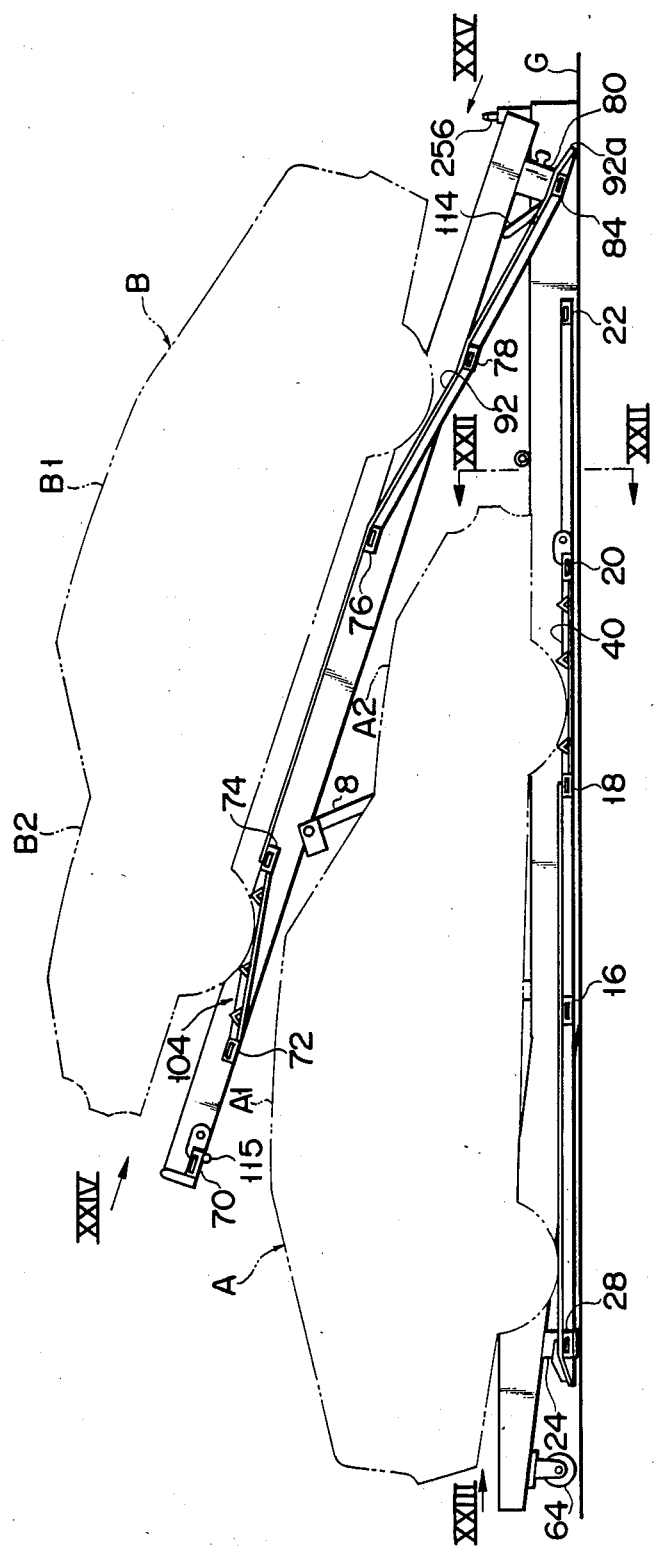
FIG. 4 is a cross-sectional view of the loading apparatus, on which automobiles are mounted.
Figures 5, 6:
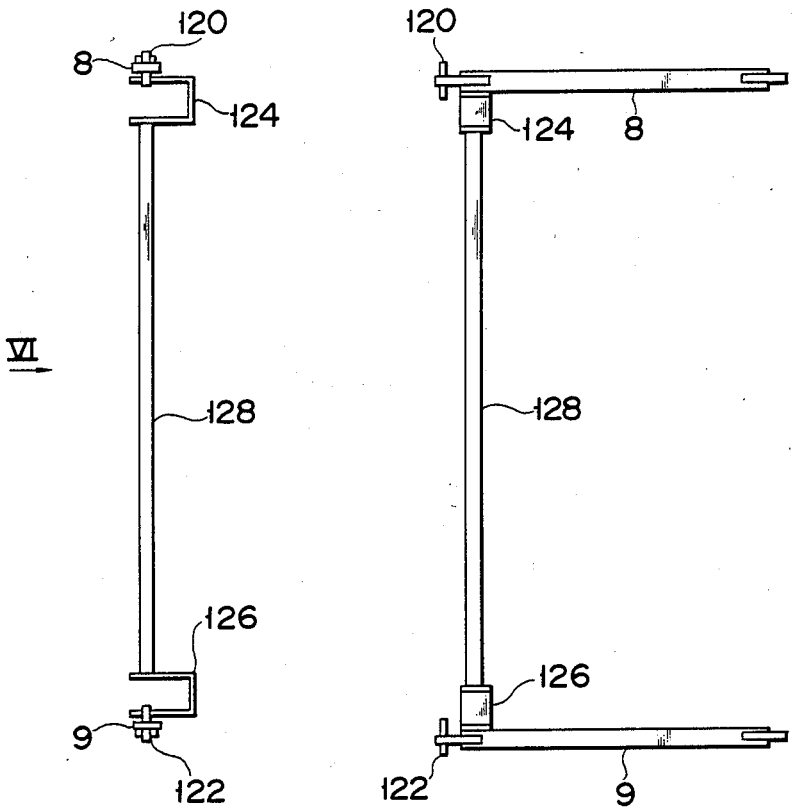
FIG. 5 shows support rods 8 and 9 as viewed in the direction of arrow V in FIG. 1.
FIG. 6 also shows the rods as viewed in the direction of arrow VI in FIG. 5.
Figure 10:
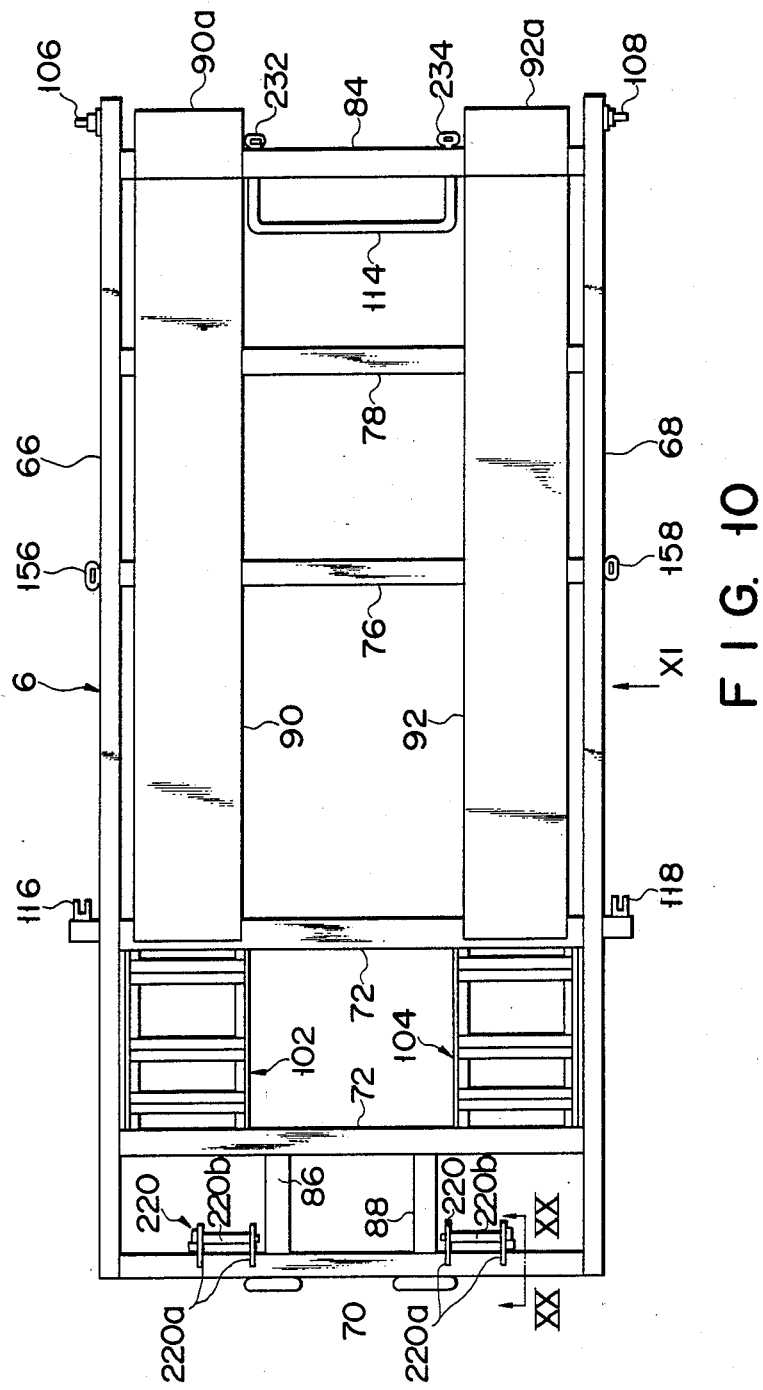
FIG. 10 is a plan view of movable deck 6 shown in FIG. 2.

As is clearly seen from FIGS. 1, 4, 10, 11, 24, 25, movable deck 6 comprises longitudinal beams 66 and 68 extending in the lengthwise direction of deck 6, and transverse beams 70, 72, 74, 76 and 78. Transverse beam 84 is connected between brackets 80 and 82 fastened to the lower surfaces of the right end portions of longitudinal beams 66 and 68, respectively. Further, auxiliary beams 86 and 88 are connected between transverse beams 70 and 72. Plates 90 and 92, both extending in the lengthwise direction of deck 6, are mounted on and fastened to transverse beams 74, 76, 78, and 84. The wheels of automobile B will be placed on these plates 90 and 92 when automobile B is mounted on deck 6. As is shown in FIG. 4, slopes 90a and 92a are provided on the right end portions of plates 90 and 92, making it easier for automobile A to ride onto deck 6. Wheel stoppers 102 and 104 are connected between transverse beams 72 and 74 in order to hold parts of the wheels of automobile B. Wheel stoppers 102 and 104 are identical in structure to wheel stopper 38 which has been described in detail, with reference to FIGS. 8 and 9. As is shown in FIG. 10, shafts 106 and 108 protrude outwardly from the outer sides of the right end portions of longitudinal beams 66 and 68, respectively. These shafts 106 and 108 are rotatably coupled to hinge brackets 110 and 112 which are fixed, as is shown in FIG. 1, to the upper surfaces of the right end portions of longitudinal beams 12 and 14 of base 4, respectively. Movable deck 6 can, therefore, move between the first position where it is laid on base 14 as is shown in FIG. 2, and the second position where the other end of movable deck 6 is located above automobile A as is shown in FIGS. 1 and 4. As is shown in engagement member 114 made of a U-shaped pipe is fastened to transverse beam 84. The fork of a forklift truck (later described) can come into engagement with this member 114, thereby to lift the right end portion of apparatus 2 (FIG. 1). Further, engagement member 115 is fastened to transverse beam 70 made of a pipe, with which the fork can come into engagement, thereby to lift the left end portion of movable deck 6.

Support rods 8 and 9 are rotatably connected, at one end, to hinge brackets 116 and 118 fixed to the outer sides of beams 66 and 68 of movable deck 6, by means of shafts 120 and 122 whose axes extend in the widthwise direction of movable deck 6. Support rods 8 and 9 can, therefore, move between one non-use position where they extend along the outer sides of beams 66 and 68 of movable deck 6, and another non-use position where their distal end portions engage with coupling mechanisms 10 and 11 thereby to hold movable deck 6 in said second position. U-shaped brackets 124 and 126 are secured to the inner sides of support rods 8 and 9, respectively. Connecting rod 128 is fastened at one end to bracket 124 and at the other end to bracket 126, whereby left and right support rods 8 and 9 can move together.

Figure 12:
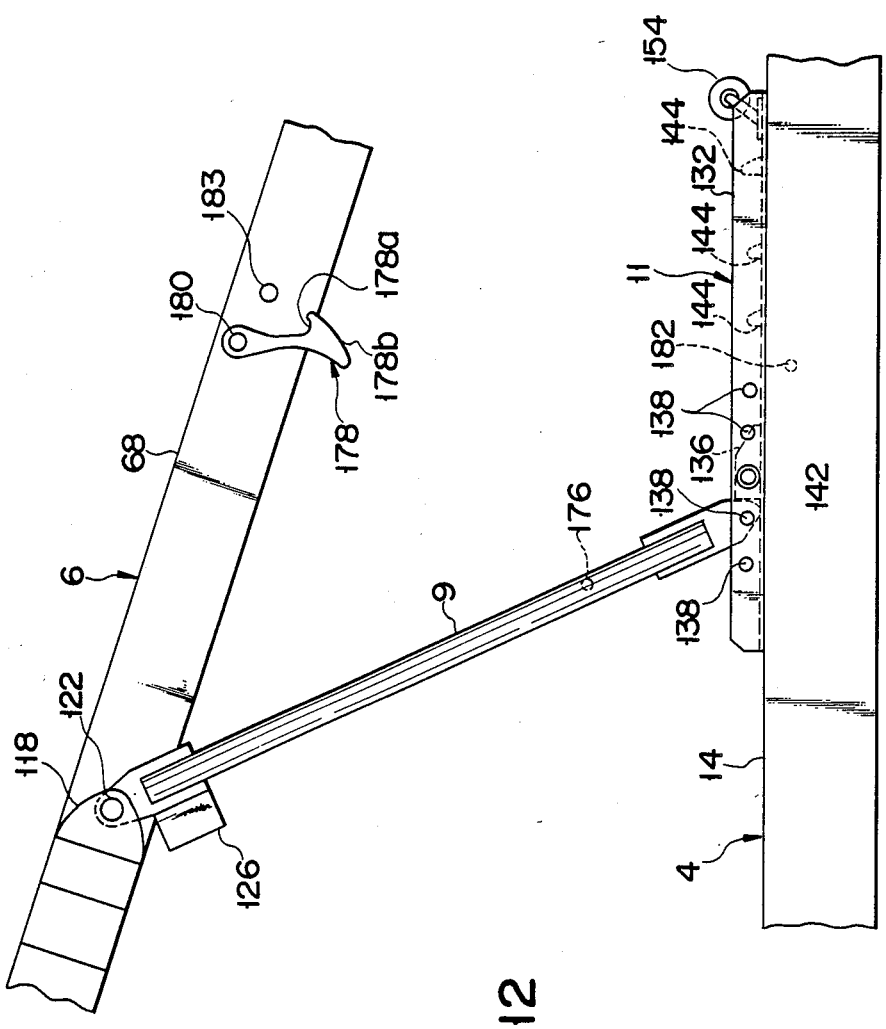
FIG. 12 is an enlarged front view, showing base 4, movable deck 6, support rod 9, and coupling mechanism 11, all shown in FIG. 1.

Coupling mechanism 10 has bracket 130 having a U-shaped cross section and secured to longitudinal beam 12 of base 4, and stopper 134 attached to bracket 130. Coupling mechanism 11 has bracket 132 having a U-shaped cross section and fastened to longitudinal beam 14 of base 4, and stopper 136 attached to bracket 132. Brackets 130 and 132 each have a plurality of holes 138 cut in their side walls and set apart at proper intervals. Stoppers 134 and 136 are fixed to brackets 130 and 132 by bolts 140 and 142 extending through one of holes 138 cut in the side walls of bracket 130 and one of holes 138 cut i the side walls of bracket 132. As is clearly shown in FIG. 12, the lower ends of support rods 8 and 9 are, therefore, prevented from moving with respect to base 4 when movable deck 6 is rotated upwardly from base 4, and movable deck 6 can thereby be held and inclined in the second position. With these coupling mechanisms 10 and 11, it is possible to adjust the angle at which movable deck 6 is inclined to base 4, by inserting bolts 140 and 142 through selected holes 138 of brackets 130 and 132, thereby changing the positions of stoppers 134 and 136 with respect to brackets 130 and 132. Further, a plurality of stoppers 144 protrude from either bracket 130 and 132. Further, a plurality of stoppers 144 protrude from either bracket 130 or 132, spaced apart from one another at proper intervals. Any of stoppers can engage with the lower end of support rod 8 and 9.

Figure 16:
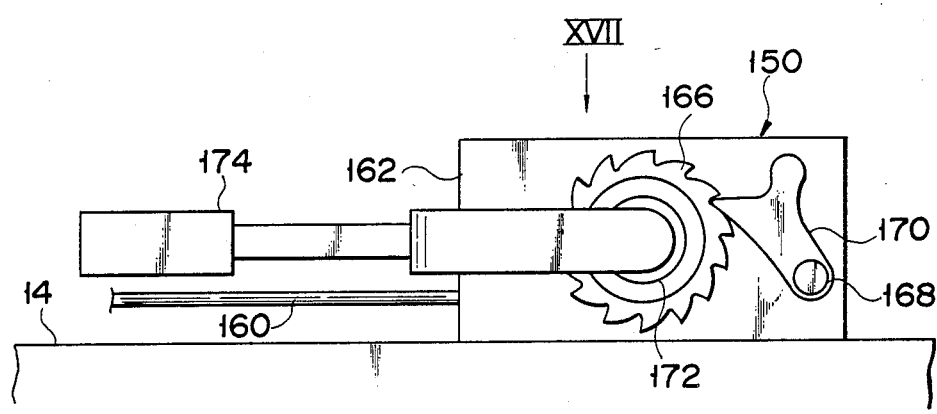
FIG. 16 is an enlarged view of take-up device 150 shown in FIG. 1.
Figure 17:
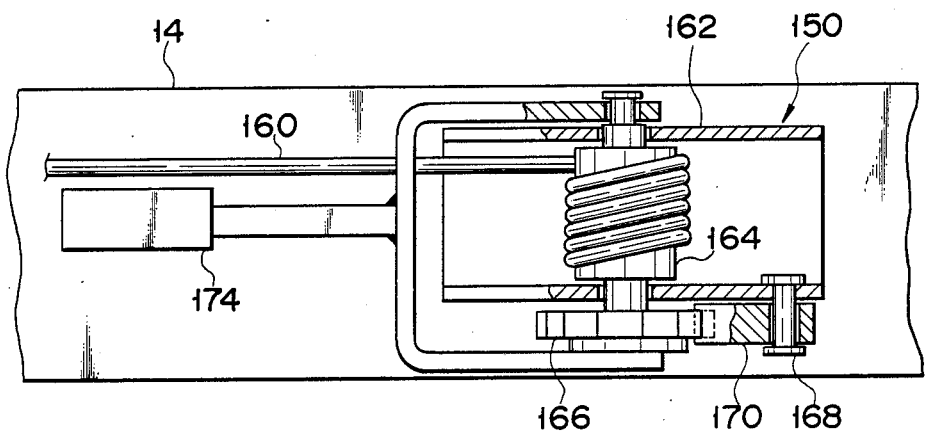
FIG. 17 shows device 150 as seen in the direction of arrow XVII.

Coupling mechanisms 10 and 11 can prevent movable deck 6 from moving downwardly from the second position, but cannot prevent movable deck 6 from moving upwardly therefrom. Therefore, anchoring device 146 is provided for controlling the upward movement of movable deck 6. Anchoring device 146 has take-up devices 148 and 150 attached to longitudinal beams 12 and 14 of base 4, respectively, pulleys 152 and 154 attached to brackets 130 and 132, respectively, rings 156 and 158 secured to the outer sides of longitudinal beams 66 and 68 of movable deck 6, respectively, and steel ropes 160 fastened at one end to rings 156 and 158, and having the other end portions would around take-up devices 148 and 150 and the intermediate portions wrapped around pulleys 152 and 154. Take-up devices 148 and 150 have the same structure. Therefore, only take-up device 150 will be explained, with reference to FIGS. 16 and 17. Take-up device 150 has U-shaped bracket 162 fixed to longitudinal beam 14, take-up shaft 164 rotatably supported by bracket 162 for taking up rope 160, ratchet wheel 166 fastened to take-up shaft 164, pawl 170 rotatably connected to bracket 162 by pin 168 for engaging with ratchet wheel 166 thereby to prevent take-up shaft 164 from rotating in such direction as to feed rope 160, and lever 174 connected to ratchet wheel 166 by one-way clutch 172. One-way clutch 172 is designed so as to allow take-up shaft 164 to rotate when lever 174 is rotated to take up rope 160 around take-up shaft 164, and not to allow take-up shaft 164 to rotate when lever 174 is rotated in the opposite direction.

In this embodiment, coupling mechanisms 10 and 11 are provided on base 4, and support rods 8 and 9 are rotatably supported by movable deck 6. Instead, support rods 8 and 9 can be rotatably supported, at one end, by base 4, and coupling mechanisms 10 and 11 can be mounted on movable deck 6 such that the other ends of support rods 8 and 9 are coupled to coupling mechanisms 10 and 11.

As is evident from FIGS. 12 to 15, pin 176 protrudes from the inner side of support rod 9, and fastening lever 178 is rotatably attached to the outer side of longitudinal beam 68 of movable deck 6 by means of pin 180. Lever 178 comes into engagement with pin 176 when support rod 9 is moved to the position shown in FIG. 13. Lever 178 thereby prevents support rod 9 from moving downwardly. Fastening lever 178 has engagement section 178a into which pin 176 can fitted, and inclining surface 178b. When movable deck 6 is inclined at the angle shown in FIG. 12 (and in the second position), lever 178 is suspended vertically due to its own weight, as is shown in the figure. When movable deck 6 is lifted a little, and support rod 9 is rotated toward fastening lever 178, pin 176 abuts on inclining surface 178b of the hook portion of fastening lever 178, whereby fastening lever 178 is slightly rotated clockwise. When pin 176 passes inclining surface 178b, fastening lever 178 is again suspended due to its own weight. When support rod 9 is moved downwards a little in this condition, pin 176 comes into engagement section 178a of fastening lever 178.

The coupling device for holding support rod 9 to movable deck 6 and in the non-use position, is constituted as has been described above.

Figure 13:
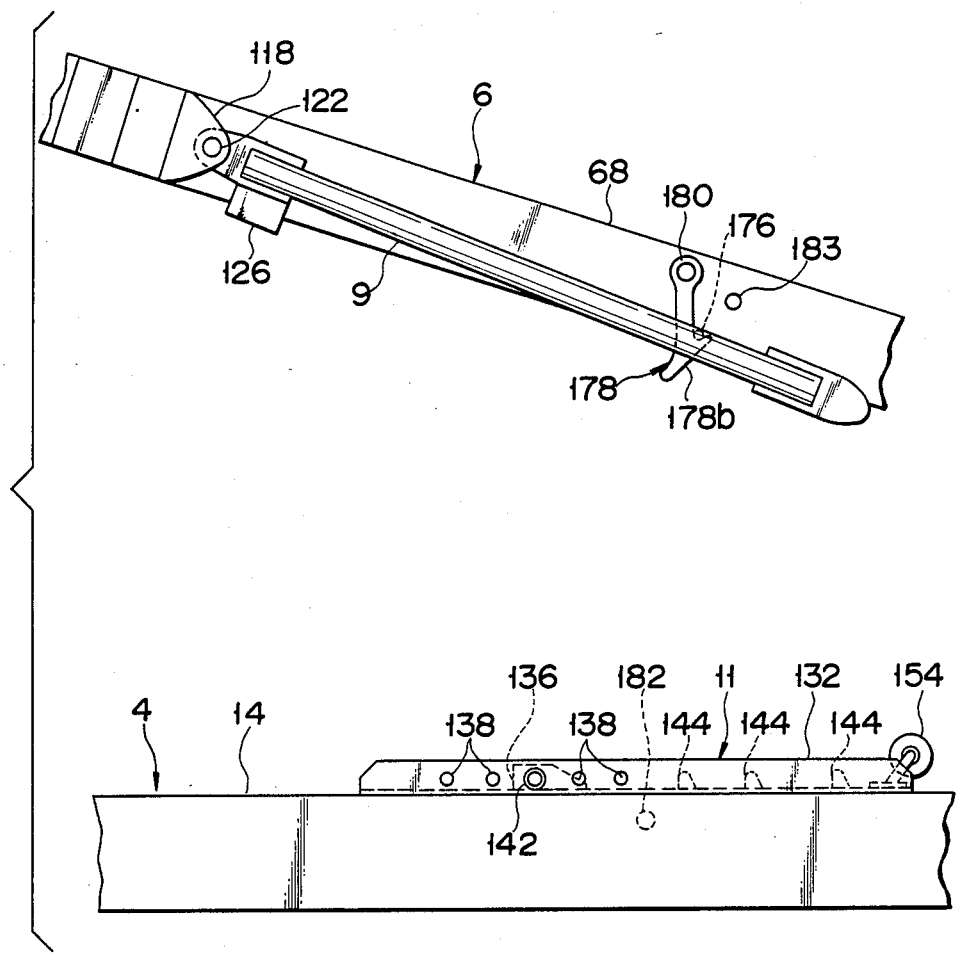
FIG. 13 is a front view showing pin 176 of rod 9, which is fastened to fastening lever 178.
Figure 14:
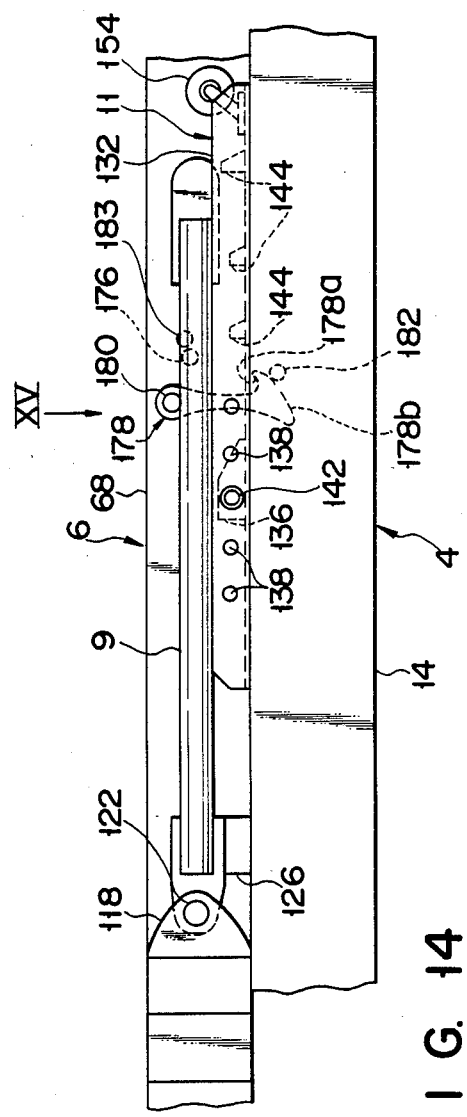
FIG. 14 is a front view showing movable deck 6 laid on base 4.
Figure 15:
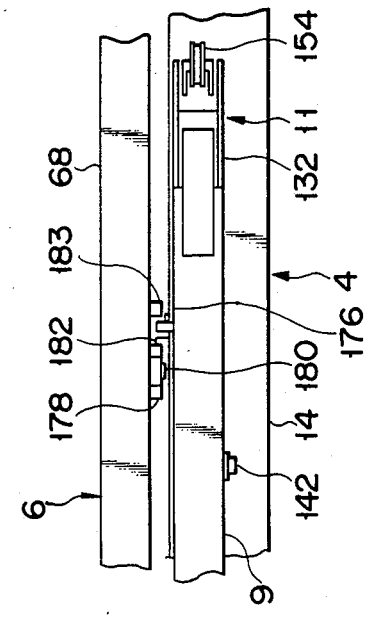
FIG. 15 shows base 4 and deck 6 as viewed in the direction of arrow XV in FIG. 14.

As long as pin 176 of support rod 9 remains in engagement section 178a of fastening lever 178, a portion of support rod 9 projects downwardly from the lower surface of longitudinal beam 68 of movable deck 6, as is illustrated in FIG. 13. Therefore, when movable deck 6 is laid on base 4 (and in the first position) as is shown in FIG. 14, support rod 9 is lifted with respect to movable deck 6, and pin 176 is released from fastening lever 178.

Pin 182 protrudes from the inner side of longitudinal beam 14 of base 4. This pin 182 is designed so as to abut on inclining surface 178b of fastening lever 178, thereby to rotate fastening lever 178, while keeping lever 178 in a substantially suspending state as is shown in FIG. 14, when movable deck 6 is rotated downwardly from the position shown in FIG. 13 until deck 6 is laid upon base 4. As movable deck 6 is gradually rotated upwards from the position shown in FIG. 14, fastening lever 178 moves up while being suspened due to its own weight, along with movable deck 6. At this time, fastening lever 178 can rise above pin 176, together with movable deck 6, since its engagement section 178a is not engaged with pin 176.

The function of pin 182 secured to base 4 will be explained. If it were not for pin 182, fastening lever 178 should be positioned more to the right than is shown in FIG. 14 when movable deck 6 is moved to the position shown in FIG. 14, in the case that fastening lever 178 in the position shown in FIG. 13 fails to rotate under the rotational moment deriving from its own weight because of foreign matter or rust present in the gap between lever 178 and shaft 180 or between lever 178 and outer side of longitudinal beam 68. If lever 178 is positioned more to the right than is illustrated in FIG. 14, support rod 9 will inevitably move upwardly as movable deck 6 is rotated upwardly from the position shown in FIG. 14. This is because fastening lever 178 engages with pin 176 of support rod 9 when movable deck 6 is rotated upwardly. This problem is solved by pin 182 since pin 182 abuts on inclining surface 178b of fastening lever 178, thus forcing fastening lever 178 into a suspened condition, when movable deck 6 is rotated to the position shown in FIG. 14, as has been described above. Pin 183 protruding from the outer side of longitudinal beam 68 functions as a stopper for limiting the angle through which fastening lever 178 can rotate. No components equivalent to pin 176, fastening lever 178 and pin 182 are provided for support rod 8. This is because support rod 8 is connected to support rod 9 by connecting rod 128, and thus move along with support rod 9.

Anchoring devices for securing automobiles A and B to base 4 and movable deck 6, respectively, will now be described.

Figure 7:
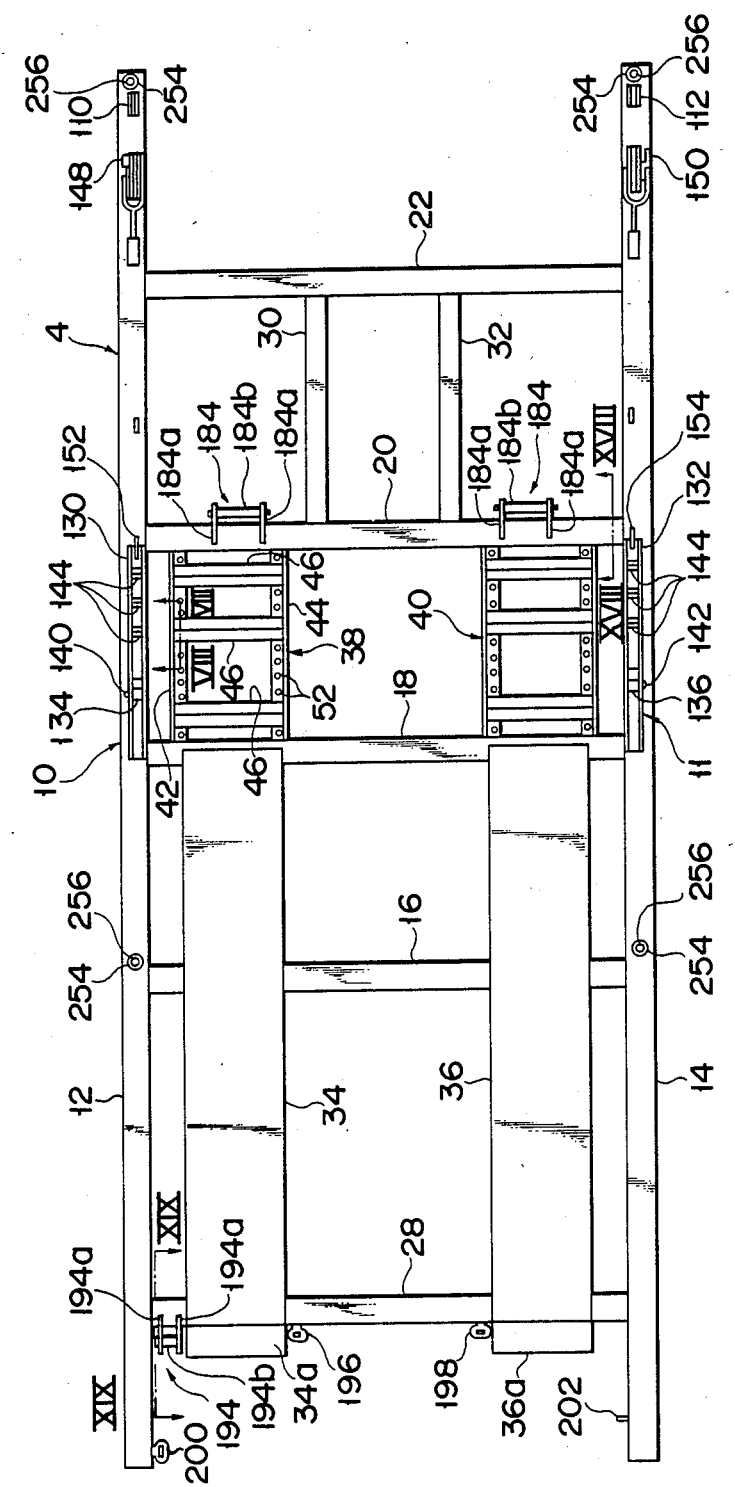
FIG. 7 is a plan view of only base 4 shown in FIG. 1.
Figure 18:
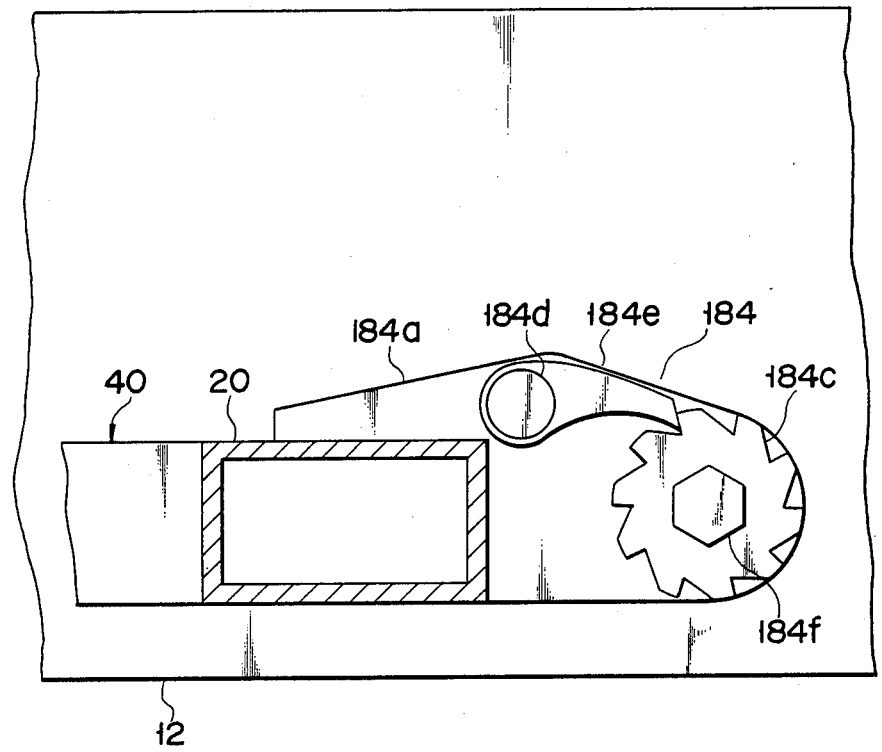
FIG. 18 is an enlarged, sectional view taken along line XVIII—XVIII in FIG. 7.
Figure 22:
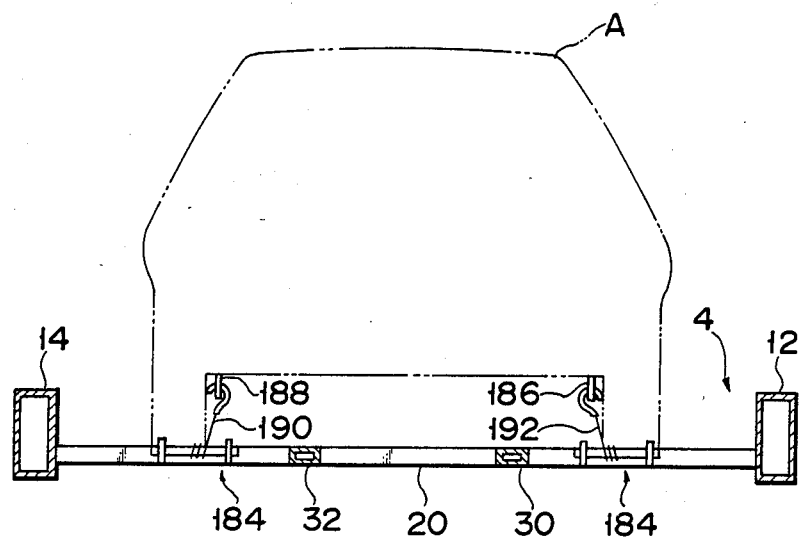
FIG. 22 is a sectional view of base 4, taken along line XXII—XXII in FIG. 4, and showing automobile A.

Firstly, the anchoring device for securing automobile A mounted on base 4 as is shown in FIG. 4, will be explained. As is clearly seen from FIG. 7, two take-up devices 184 are attached to transverse beam 20 of base 4. As is illustrated in FIGS. 7 and 18, either take-up device 184 has brackets 184a fixed to transverse beam 20, take-up shaft 184b rotatably supported between bracket 184a, ratchet wheel 184c fastened to one end of take-up shaft 184b, pawl 184e rotatably connected to bracket 184a by shaft 184d and engaging with ratchet wheel 184c thereby to prevent take-up shaft 184d from rotating in such direction as to feed a rope, and hexagonal engagement section 184f secured to ratchet wheel 184c and being able to engage with a tool such as wrench. As is shown in FIG. 22, steel ropes 190 and 192 are connected, at one end, to hooks 186 and 188 attached to the front, lower part of automobile A. The other end portions of steel ropes 190 and 192 are taken up by take-up devices 184, thus imparting a sufficient tension on ropes 190 and 192, thereby anchoring the front section of automobile A.

Figure 19:
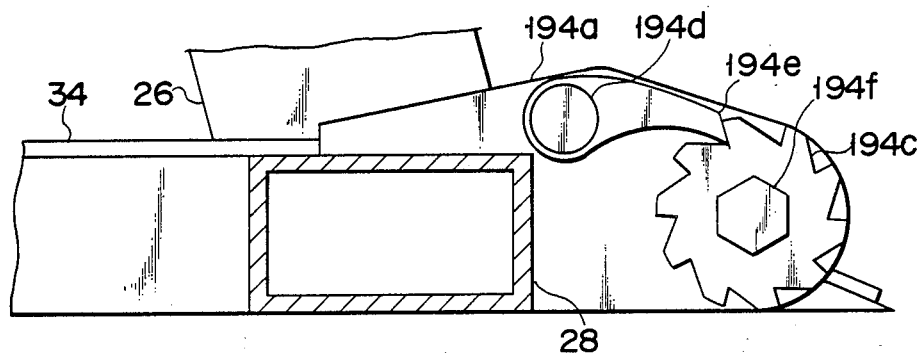
FIG. 19 is an enlarged, sectional view taken along line XIX—XIX in FIG. 7.
Figure 23:
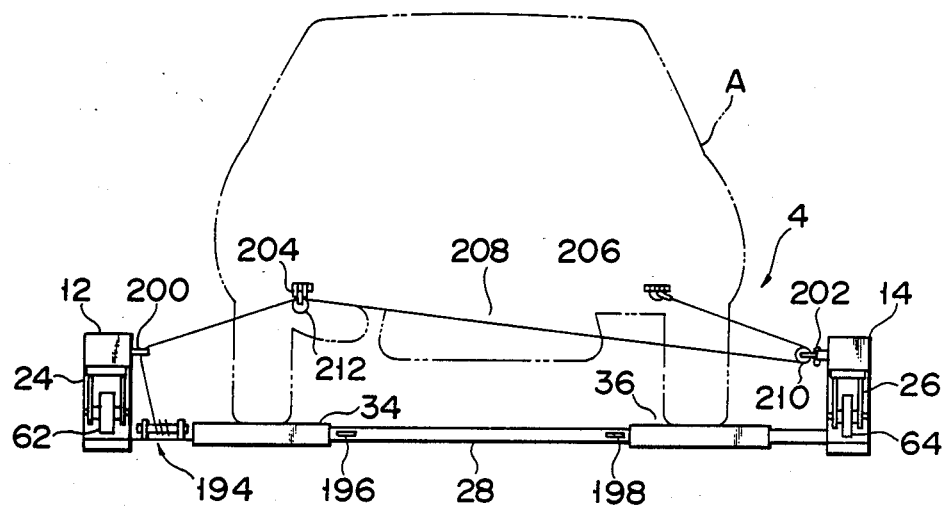
FIG. 23 shows base 4 and automobile A, as viewed in the direction of arrow XXIII (FIG. 4).

As is shown in FIGS. 7 and 23, take-up device 194 and rings 196 and 198 are attached to transverse beam 28 of base 4. Ring 200 is attached to longitudinal beam 12, and ring 202 is attached to longitudinal beam 14. Take-up device 194 is of the substantially the same structure as take-up device 184. That is, as is evident from FIGS. 7 and 19, take-up device 194 has brackets 194a fixed to transverse beam 28, take-up shaft 194b, ratchet wheel 194c, shaft 194d, pawl 194e, and engagement section 194f. Comprised of these parts, take-up device 194 has the same function as take-up device 184. As is shown in FIGS. 23, steel rope 208 is connected, at one end, to hook 206 secured to the rear, lower section of automobile A. The other end portion of steel rope 208 is wound around pulley 210 suspended from hook 204, pulley 212 suspended from hook 204 attached to the rear, lower section of automobile A, is passed through ring 200, and is taken up by take-up device 194, thereby imparting a sufficient tension to rope 208 to anchor the rear section of automobile A to base 4.

The rear section of automobile A can be anchored to base 4 in another way. That is, as is shown in FIG. 26, one other end portion of steel rope 214, which is connected at the other end to ring 202, is wrapped around pulley 216 suspended from hook 202, is passed through rings 198 and 196, wrapped around pulley 218 suspended from hook 204, is passed through ring 200, as is taken up by take-up device 194.

Moreover, the rear section of automobile A can be anchored to base 4 in the same way as the front section. In other words, it can of course be anchored to base 4 by providing two take-up devices near hooks 204 and 206, respectively, and by taking up the end portions of two steel ropes around these take-up devices, which are connected at the other end to hooks 204 and 206, respectively.

Now, the anchoring device for securing automobile B mounted on movable deck 6 as is shown in FIG. 4, will be explained.

Figure 24:
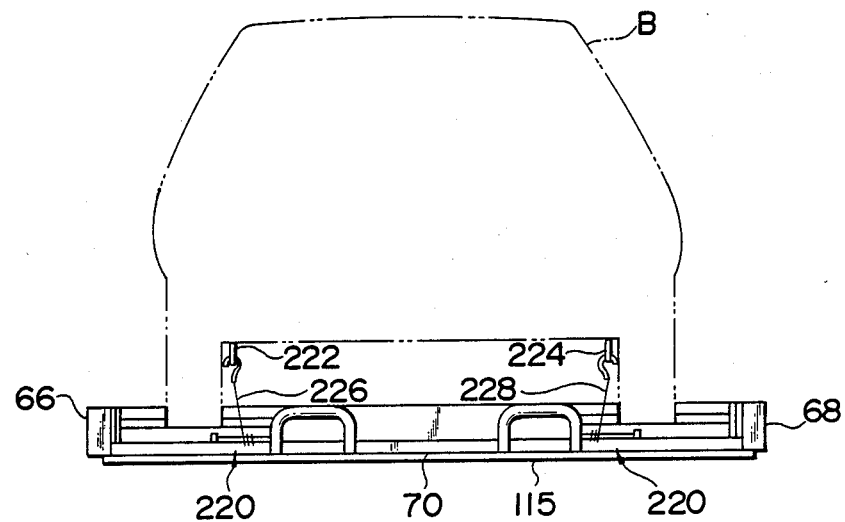
FIG. 24 shows movable deck 6 and automobile B, as seen in the direction of arrow XXIV (FIG. 4).

Two take-up devices 220 are attached to transverse beam 70 of movable deck 6. These take-up devices 220 are of substantially the same structure as take-up devices 184. That is, as is shown in FIGS. 10 and 20, either take-up device 220 has brackets 220a fixed to transverse beam 70, shaft 220b, rachet wheel 220c, shaft 220d, pawl 220e, and engagement section 220f. Comprised of these parts, take-up devices 220 have the same function as take-up devices 184. As is shown in FIG. 24, steel ropes 226 and 228 are connected, at one end, to hooks 222 and 224 attached to the front, lower section of automobile B. The other end portions of steel ropes 226 and 228 are taken up by take-up devices 220, whereby a sufficient tension is imparted to both ropes 226 and 228, and the front section of automobile B is anchored to movable deck 6.

Figure 11:
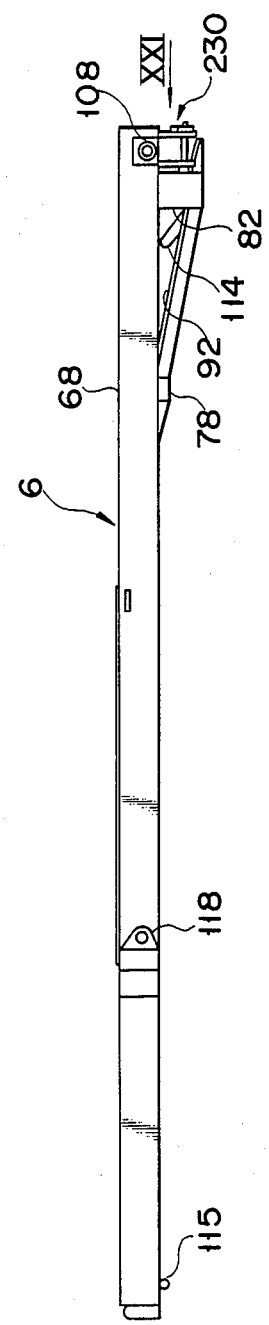
FIG. 11 shows deck 6 as seen in the direction of arrow XI in FIG. 10.
Figure 25:
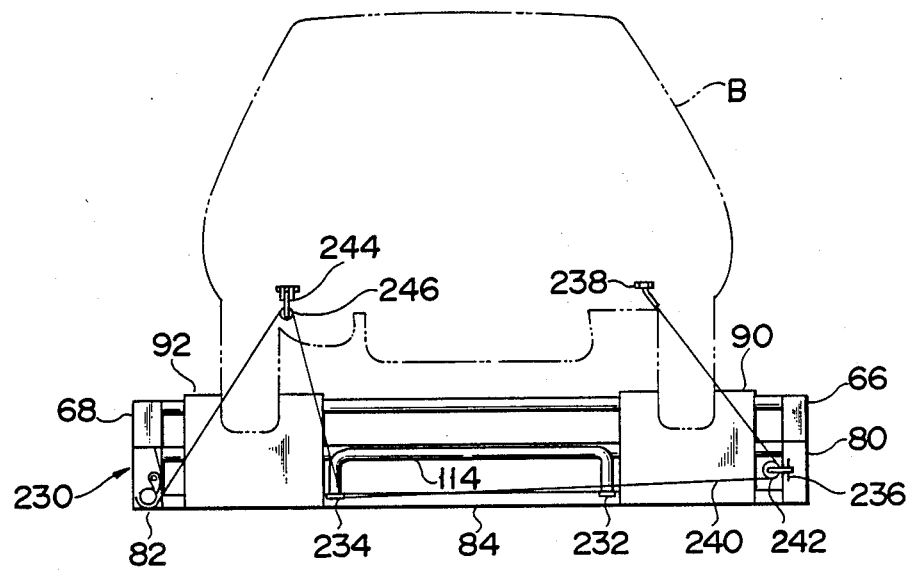
FIG. 25 shows movable deck 6 and automobile B, as viewed in the direction of arrow XXV (FIG. 4).

Moreover, as is shown in FIGS. 10, 11 and 25, take-up device 230 is attached to longitudinal beam 68 of movable deck 6, rings 232 and 234 are attached to transverse beam 84, and ring 236 is attached to bracket 80. Take-up device 230 is of substantially the same structure as take-up devices 184. That is, as is illustrated in FIGS. 11 and 21. take-up device 230 has brackets 230a secured to longitudinal beam 68, take-up shaft 230b, ratchet wheel 230c, shaft 230d, pawl 230e, and engagement section 230f. Comprised of these parts, take-up device 230 has the same function as take-up devices 184. As is shown in FIGS. 25, steel rope 240 is connected, at one end, to hook 238 fixed to the rear, lower section of automobile B. The other end portion of steel rope 240 is wrapped around pulley 242 suspended from ring 236, is passed through ring 234, is wrapped around pulley 246 suspended from hook 244 also secured to the rear, lower section of automobile B, and is taken up by take-up device 230, thereby imparting a sufficient tension to rope 240. The rear section of automobile B is thereby anchored to movable deck 6.

The rear section of automobile B can be anchored to movable deck 6 in another way. That is, as is illustrated in FIG. 27, one end of steel rope 248 is connected to ring 236, and the other end portion of this rope 248 is wrapped around pulley 250 suspended from hook 238, is passed through rings 232 and 234, is wound around pulley 252 suspended from hook 244, and is taken up by take-up device 230.

Moreover, the rear section of automobile B can be anchored to movable deck 6 in the same way as the front section. In other words, it can of course be anchored to movable deck 6 by providing two take-up devices near hooks 238 and 244, respectively, and by taking up the end portions of two steel ropes around these take-up devices, which are connected at the other end to hooks 204 and 206, respectively.

Figure 32:
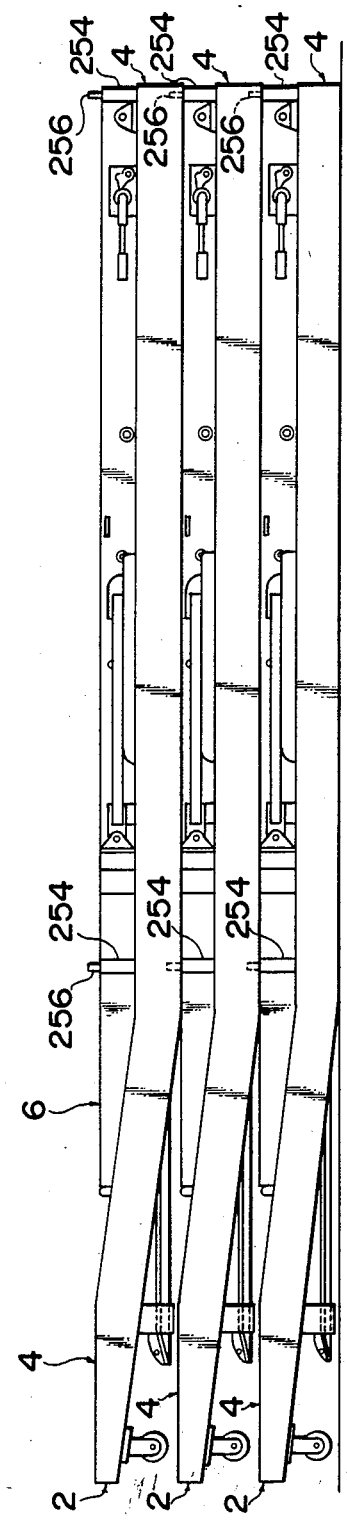
FIG. 32 is a front view showing a plurality of the loading apparatuses not in use, laid one upon another.

Four posts 254 are fixed to the upper surfaces of longitudinal beams 12 and 14 of base 4. The tops of these posts are at the same level as the upper surface of movable deck 6 laid upon base 4. Pin 256 protrudes from the top of each of these posts 254. Engagement holes 258 are formed in the lower surfaces of longitudinal beams 12 and 14 of base 4, in such positions that pins 256 can be fitted in holes 258 of another loading apparatus. Hence, when pins 256 of the loading apparatus with movable deck 6 laid upon base 4 are fitted in engagement holes of the other loading apparatus laid upon this apparatus as is illustrated in FIG. 32, a plurality of loading apparatuses, which are in non-use condition, can be stably laid one upon another.

The method of using loading apparatus 2 of this invention will now be explained. There are two ways of loading two automobiles onto apparatus 2. First, it will be described how to load automobile A onto base 4, and then automobile B onto movable deck 6.

First, movable deck 6 is rotated upward from the first position (FIG. 1) to the second position (FIG. 2) by means of a forklift truck, whose fork is engaged with engagement member 115 of movable deck 6. Deck 6 is lifted until the lower ends of support rods 8 and 9 are held by stoppers 134 and 136 of coupling mechanisms 10 and 11. If movable deck 6 is sufficiently light, it is manually lifted from the first position to the second position. Thereafter, ropes 160, connected at one end to rings 156 and 158, are taken up by take-up devices 148 and 150, thus imparting a sufficient tension to each rope 160. The lower ends of support rods 8 and 9 are, thereby, firmly held by stoppers 134 and 136. Then, automobile A is driven forward onto base 4 from the left (FIG. 1), and the front wheels of automobile A are rested on wheel stoppers 38 and 40 as is shown in FIG. 4. In this condition, the plane, including the front edge of roof panel A1 of automobile A and the front edge of bonnet A2 thereof, is located parallel and close to the lower surface of movable deck 6. This is because the positions of stoppers 134 and 136 with respect to brackets 130 and 132 of coupling mechanisms 10 and 11, and the positions of bars 46 of wheel stoppers 38 and 40 with respect to beams 42 and 44, have been adjusted for this purpose. Next, automobile A is anchored to the base by means of ropes 190, 192 and 208. Thereafter, automobile B is driven forward onto movable deck 6 from the right (FIG. 1). The front wheels of automobile A are rested on wheel stopper 102 and 104 as is illustrated in FIG. 4. Then, automobile B is anchored to movable deck 6 by means of ropes 226, 228, and 240. Thus, two automobiles A and B have been mounted on loading apparatus 2.

It will now be described how to load automobile B onto movable deck 6, and then automobile A onto deck 6.

In this case, automobile B is driven forward from the right (FIG. 2) onto movable deck 6 located in the first position (FIG. 2), and the front wheels of automobile B are rested on wheel stoppers 102 and 104. Then, automobile B is anchored to movable deck 6 by means of ropes 226, 228, and 240. Since the anchoring is carried out while movable deck 6 is remaining in the first position, it can be easily performed.

Then, the forklift truck is driven from the left (FIG. 2) until its fork is engaged with engagement member 115 of movable deck 6, to which automobile B has been anchored. The fork is moved upward, thereby lifting movable deck 6 to the second position shown in FIG. 1. The lower ends of support rods 8 and 9 are held by stoppers 134 and 136 of coupling mechanisms 10 and 11, respectively. Then, ropes 160 are wrapped around as is shown in FIG. 1 and taken up by take-up devices 148 and 150, whereby a sufficient intention is applied to both ropes 160. Thereafter, automobile A is driven forward onto base 4 from the left (FIG. 1). The front wheels of automobile A are put on wheel stoppers 38 and 40 as is illustrated in FIG. 4. In this condition, as in the first case, the plane, including the frond edges of roof panel A1 of automobile A and the front edge of bonnet A2 thereof, is located substantially parallel to, and close to, the lower surface of movable deck 6. This is because the positions of stoppers 134 and 136 with respect to brackets 130 and 132 of coupling mechanisms 10 and 11, and the positions of bars 46 of wheel stoppers 38 and 40 with respect to beams 42 and 44, have already been adjusted for this purpose. Then, automobile A is anchored to movable deck 6 by means of ropes 190, 192, and 208. Thus, two automobiles A and B have been mounted on loading apparatus 2.

After two automobiles A and B have been loaded onto loading apparatus 2, fork 262 of forklift truck 260 is engaged with engagement member 114, and is moved up, thus raising the right end of aparatus 2 about 100 and 200 mm the under sufaces of longitudinal beams 12 and 14 is thereby lifted from plane G completely. In this condition, only wheels 62 and 64 contact the ground as is shown in FIG. 28. Forklift truck 260 is then driven forward, thereby to move loading apparatus 2 into container 264. As is shown in FIGS. 31, attachment 270 having two projections 270a and 270b is fitted on and fastened by bolts (not shown) to fork 262 of forklift truck 260. This attachment is designed so as to makes it easier for fork 262 to engage with engagement member 114. Two projections 270a and 270b are set apart for a distance slightly greater than the width of engagement member 114, so that forklift truck 260 can be steered a little when it pushes loading apparatus 2 forward as is illustrated in FIGS. 28. Before loading apparatus 2 into container 264, tapered block 268 placed on the ground, with its thicker end contacting the entrance end of container 264. This is because there is a step between plane G and floor 266 of container 260. If necessary, guides are provided on tapered block 268, for guiding the two wheels 62 and 64 of loading apparatus 2 into predetermined positions within container 264. As is shown in FIG. 30, blocks 276 and 278 made of wood or the like are driven, if necessary, into the gap between longitudinal beam 12 of base 4 and one side wall 272 of container 264, and the gap between longitudinal beam 14 of base 4 and the other side wall 274 of container 264. Loading apparatus 2 is thereby stably held within container 264.

Instead of blocks 276 and 278, use can be made of projections which protrude from the outer sides of longitudinal beam 12 and 14 and can be moved horizontally by means of screw-type or lever-type mechanisms. In this case, took base 4 can be stably held within container 264 by abutting the projections against side walls 272 and 274 of container 264, respectively.

Thereafter, the second loading apparatus 2 is loaded into container 264. Hence, two loading apparatuses 2 have been loaded into container 264, as is illustrated in FIG. 29. In order to bring loading apparatus 2 from the condition of FIG. 1 into the condition of FIG. 2 after apparatus 2 has been used, take-up devices 148 and 150 are operated, thus slackening the ropes. Then, movable deck 6 is slightly lifted by means of the forklift truck or the like, and is held in this lifted position. Support rods 8 and 9 are rotated counterclockwise (FIG. 1), thus engaging pin 176 with fastening lever 178. Thereafter, movable deck 6 is gradually lowered to the first position shown in FIG. 2, by means of the forklift truck or the like. As a result, movable deck 6 is laid upon base 4.

The embodiment described above can achieve the advantages which will be described below. When movable deck 6 is in the second position, automobile B is mounted on movable deck 6, with its bonnet B2 located at a level higher than the rear. In this condition, movable deck 6 is substantially parallel to, and close to, the plane including the front edge of roof panel A1 of automobile A and the front edge of bonnet A2 thereof. Therefore, the plane including the front edge of roof panel B1 of automobile B and the front edge of bonnet B2 thereof is substantially horizontal. In addition, the total height of both automobiles A and B mounted on the loading apparatus is much smaller than the sum of the height of automobile A and that of automobile B. Further, the total length of automobiles A and B mounted on the loading apparatus is far shorter than the sum of the length of automobile A and that of automobile B. Since both the total height of automobiles A and B, and the total length thereof, are minimized, the automobiles can be loaded within container 264, leaving an extremely small space unoccupied in container 264. The test conducted by the applicant hereof has showed that apparatus 2 makes it possible to load four automobiles in the standard-size container used in the United States for railroad transportation, whereas only two automobiles can be loaded in this container by the conventional method.

When loading apparatus 2 is not used, it can be folded very compact by, as is shown in FIG. 2, laying movable deck 6 and support rods 8 and 9 upon base 4. Moreover, many loading apparatuses can be laid, one upon another, and can be stably held together by, as is shown in FIG. 32, inserting pins 256 into engagement holes 258 of apparatuses 2. Hence, loading apparatus 2 can be transported with a high space-efficiency and in a great safety.

Still further, since automobile A has its front facing movable deck 6, and automobile B has its front positioned at a level higher than its rear, both automobiles A and B can be driven forward onto loading apparatus 2. In other words, automobiles A and B need not be driven backward to be loaded onto apparatus 2. Therefore, automobiles A and B can very easily be mounted on loading apparatus 2.

Furthermore, no device is required to prevent apparatus 2 from moving since the lower surfaces of both longitudinal beams 12 and 14 of base 4 fully contact plane G when automobiles A and B are mounted on apparatus 2. In addition, in order to load apparatus 2 into container 264, it suffices to slightly lift the right end (FIG. 1) of base 4 by means of a forklift truck, thus moving up the lower surface of base 4 from plane G, and to drive the forklift truck toward container 264, while maintaining only heels 62 and 64 in contact with plane G. Both automobiles A and B, mounted on apparatus 2, can thereby be loaded into container 264. Hence, loading apparatus 2 can be easily and quickly loaded into container 264.

Container 264 shown in FIG. 29 has such a size that two loading apparatuses 2, and hence, four automobiles, can be loaded. Needless to say, the loading apparatus of the present invention can be applied when automobiles are loaded into containers for loading one automobile each.

The positions where the lower ends of support rods 8 and 9 are engaged with coupling mechanisms 10 and 11 can be changed by selecting the positions where stoppers 134 and 136 are fixed to brackets 130 and 132. Hence, the angle, at which movable deck 6 is inclined to base 4 in the second position, can be adjusted. Further, wheel stoppers 38 and 40 for holding the front wheels of automobile A, and wheel stoppers 102 and 104 for holding the front wheels of automobile B, can be secured at different positions. Therefore, loading apparatus 2 can serve to load automobiles having sizes and shapes different from those of automobiles A and B into the container, without reducing the space-efficiency.

Moreover, the lower ends of support rods 8 and 9 get over stoppers 144 of coupling mechanisms 10 and 11, respectively, as movable deck 6 is lifted from the first position (FIG. 2) to the second position. Therefore, should the means, such as a forklift truck, for lifting movable deck 6 fail to function for some reason, while lifting movable deck 6, the lower ends of support rods 8 and 9 would remain in engagement with one of stoppers 144 of mechanism 10 and one of stoppers 144 of mechanism 11, respectively. This helps to enhance the safety of the automobile-loading operation.

When movable deck 6 is lowered after the use of loading apparatus 2, thereby to lay deck 6 upon base 4, pin 176 of support rod 9 is engaged with fastening lever 178 as is shown in FIG. 14. As a result, both support rods 8 and 9 are positioned along the sides of movable deck 6. Therefore, movable deck 6 can be lowered, without bringing the lower ends of support rods 8 and 9 into engagement with stoppers 134 and 136 of coupling mechanisms 10 and 11, or with stoppers 144. Further, when movable deck 6 is laid upon base 4, support rod 9 abuts against bracket 132 of coupling mechanism 11 and slightly moves upwards as has been described with reference to FIG. 14. Pin 176 is thereby released from fastening lever 178, and pin 182 forcibly moves fastening lever 178 out of the engagement with pin 176. When movable deck 6 is lifted in this condition, it can move upwardly without bringing fastening lever 178 into engagement with pin 176. It is, therefore, unnecessary to take specific measures to disengage fastening lever 178 from pin 176 in order to lift movable deck 6 from the first position (FIG. 2) to the second position (FIG. 1).

Figure 33:
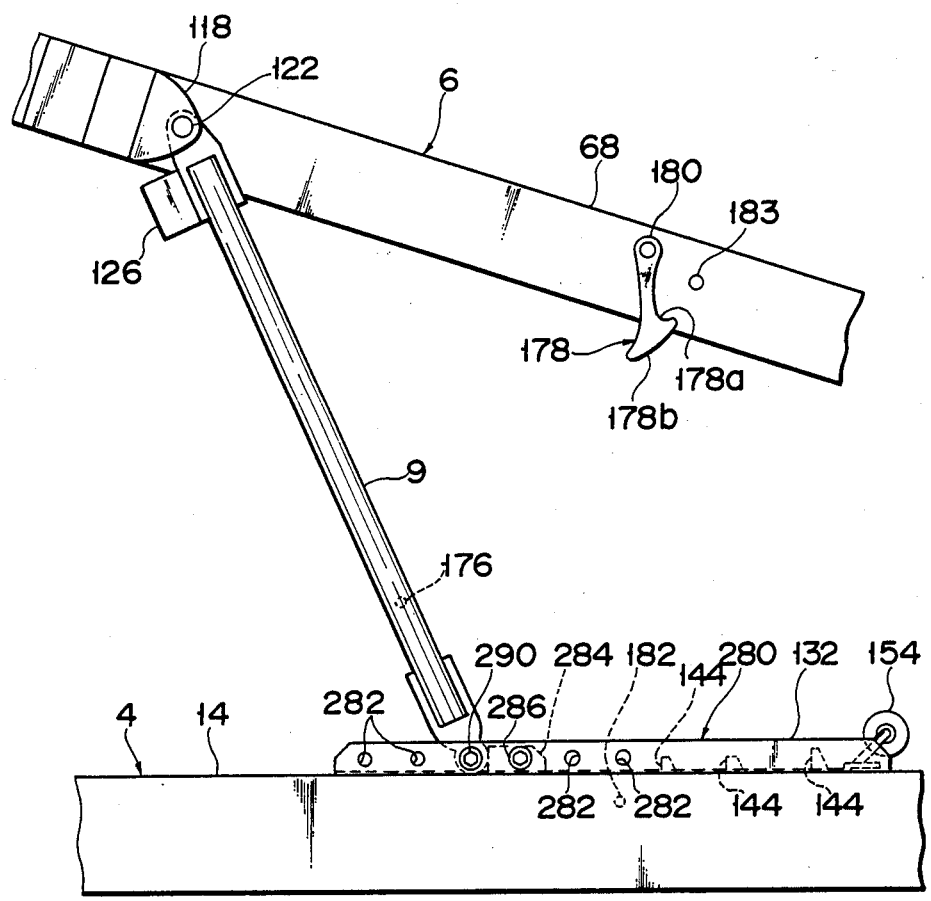
FIG. 33 is an enlarged front view of another example of coupling mechanism 11 for supporting the lower end of support rod 9.

Other examples of coupling mechanisms 10 and 11, which are designed to hold movable deck 6 in the second position, are illustrated in FIGS. 33 and 34. In FIGS. 33 and 34, the same numerals are used to denote the components which are substantially identical to those of mechanisms 10 and 11 described above. These components will not be described in detail.

Coupling mechanism 280 shown in FIGS. 33 and 34 has bracket 132 fixed to longitudinal beam 14 of base 4 and having a U-shaped cross section. A plurality of holes 282 are cut in both side walls of bracket 132, spaced apart from one another at equal intervals, and arranged in the lengthwise direction of brackets 132. Stopper 284, which abuts on the lower end of support rod 9, is secured to bracket 132 by bolt 286 extending through one of holes 282. A plurality of stoppers 144 is secured also to bracket 132, and these stoppers 144 are spaced apart at proper intervals. The lower end of support rod 9 is rounded, defining an arc having radius r. Hole 288, which is coaxial with this arc, is cut in the lower end of rod 9. As is shown in FIG. 33, the lower end of support rod 9 is made to contact stopper 284 and the bottom of bracket 132, and is fastened to bracket 132 by bolt 290 extending through hole 282 of bracket 132 and through hole 288 of support rod 9. Movable deck 6 is thereby held in the second position. Radius r of the lower end of rod 9 is equal to the distance between the center of hole 282 and the bottom of bracket 132, so that hole 288 is coaxial with hole 282 as long as the lower end of support rod 9 abuts against stopper 284 and also against the bottom of bracket 132. Stopper 284 is designed so as to have its end touch the lower end of support rod 9.

In this coupling mechanism 280, bolt 290 prevents support rod 9 from moving upwardly. Therefore, ropes 160 need not be used to hold movable deck 6 in the second position. Further, since the lower end of support rod 9 abuts on stopper 284 and the bottom of bracket 132 as long as movable deck 6 remains in the second position, the weight of movable deck 6 and the weight of the automobile mounted on deck 6 are applied to stopper 284 and the bottom of bracket 132. Thus, no great load acts downwardly on bolt 290. This is very advantageous from a mechanical point of view.

FIGS. 35 to 38 show another example of a coupling device for engaging support rod 9, which is in the non-use position, with movable deck 6. In FIGS. 35 to 38, the same numerals are used to designate the components substantially identical to those described above. These components will not be described in detail.

Figure 35:
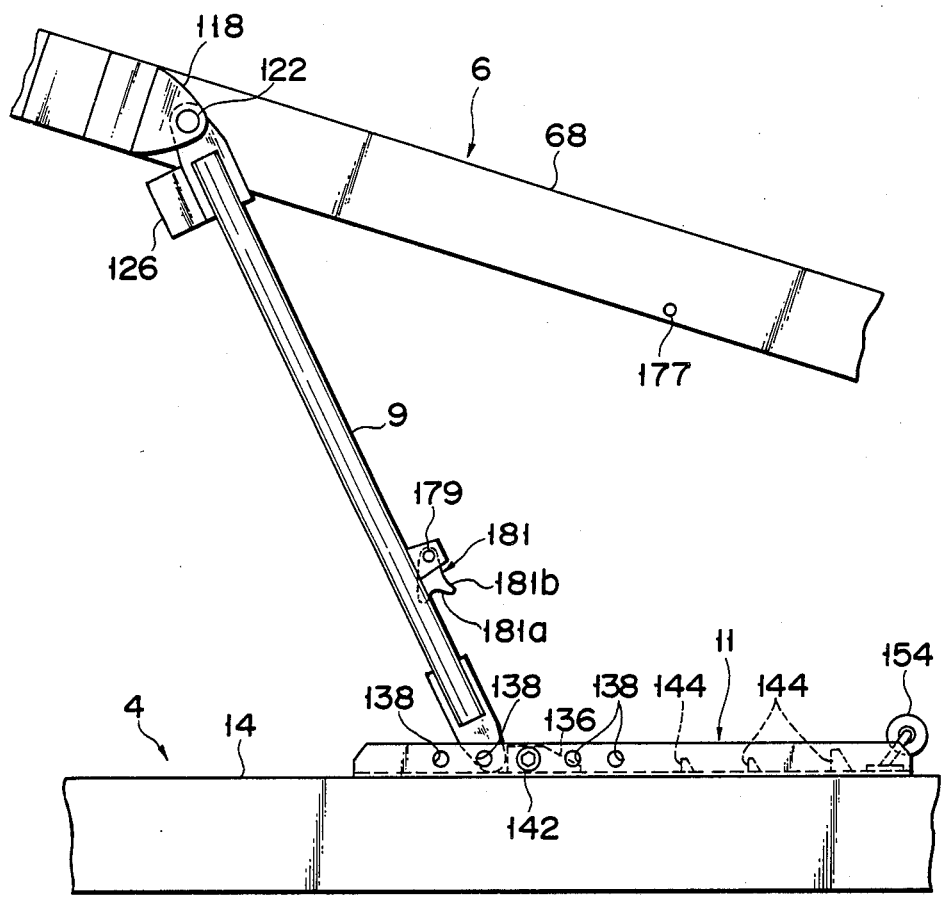
FIG. 35 is an enlarged front view showing base 4, movable deck 6, support rod 9, and coupling mechanism 11, base 4 having another type of fastening device for fastening support rod 9 to movable deck 6 when rod is in non-use position.

The coupling device shown in FIGS. 35 to 38 has support rod 177 protruding from the outer side of beam 68 of movable deck 6, and fastening lever 181 rotatably coupled to support rod 177 by pin 179 and able to engage with support rod 177. Fastening lever 181 has engagement section 181a in which support rod 177 can be fitted, and inclining surface 181b. Lever 181 is suspended due to its own weight as is shown in FIG. 35 as long as movable deck 6 remains inclined at the angle shown in FIG. 35 (and thus stays in the second position). When movable deck 6 is slightly lifted, and support rod 9 is rotated toward support rod 177, support rod 177 abuts against inclining surface 181b of the hook portion of fastening lever 181, thereby slightly rotating fastening lever 178 clockwise. When support rod 177 passes by inclined surface 181b, fastening lever 181 is gain suspended due to its own weight. When support rod 9 is lowered a little in this condition, support rod 177 goes into engagement with engagement section 181a of fastening lever 181. This coupling device can, thus, hold support rod 9, which is in the non-use position, to movable deck 6.

As is illustrated in FIG. 36, a part of support rod 9 projects downwardly from the lower surface of longitudinal beam 68 of movable deck 6, as long as support rod 177 is engaged with engagement section 181b of fastening lever 181. Thus, support rod 9 is lifted with respect to movable deck 6, thereby releasing support rod 177 from fastening lever 181 when movable deck 6 is laid upon base 4 (the first position) as is shown in FIG. 37 and 38. Therefore, the coupling device of FIGS. 35 to 38 can perform the same function, and attain the same advantage, as the device described above and shown in FIGS. 12 to 15.

In the method of using loading apparatus 2, described above, automobiles A and B can each be arranged in the opposite direction, provided that automobiles A and B are small enough to leave sufficient space when they are loaded within container 264. If this is the case, the space-efficiency will be much enhanced.

Figure 39:
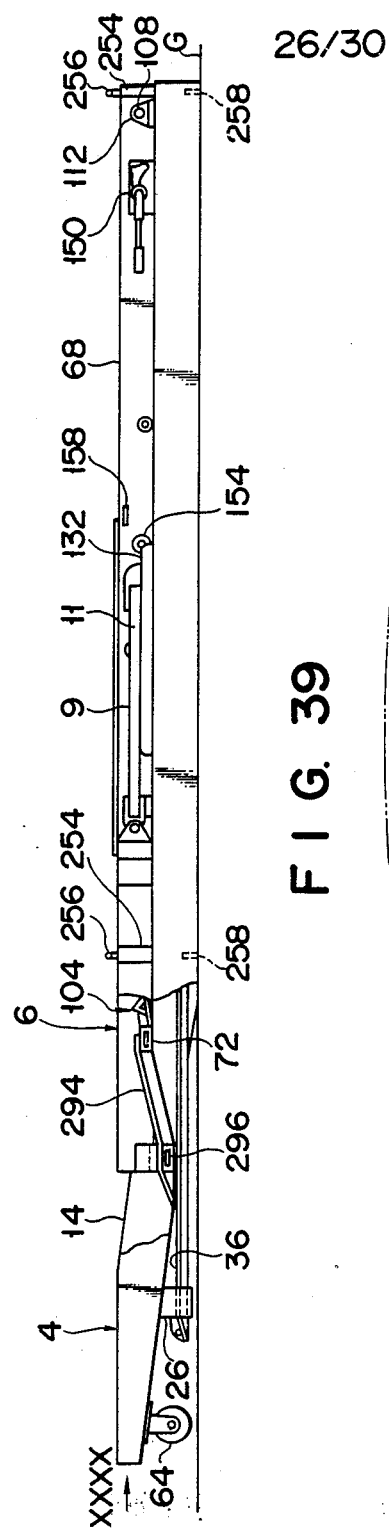
FIG. 39 is a front view of a modification of movable deck 6.
Figure 40:
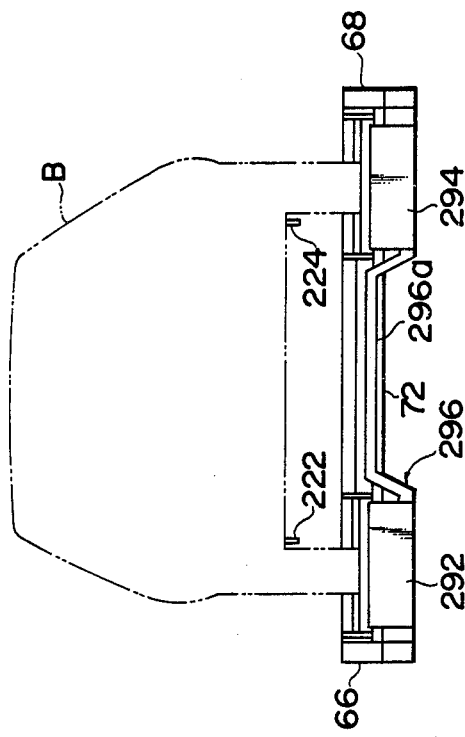
FIG. 40 shows movable deck 6 as viewed in the direction of arrow XXXX (FIG. 39).

Base 4 and movable deck 6 of loading apparatus 2 can be modified such that automobile B can be driven from the left (FIG. 1) onto movable deck 6 held in the first position (FIG. 1), passing a portion of base 4. Such a modification will be explained with reference to FIGS. 39 and 40. Plates 292 and 294 are connected to the left end of movable deck 6. These plates support the wheels of automobile B when automobile B is driven from the left onto movable deck 6 held in the first position. Plates 292 and 294 bridge transverse beam 72 and transverse beam 296 interposed between longitudinal beams 66 and 68. They are inclined downwardly to the left (FIG. 39), so that automobile B can easily be mounted onto movable deck 6. Transverse beam 296 has its middle portion bent upwardly, which functions as engagement section 296a. The fork of the forklift can thus easily engage with transverse beam 296 in preparation for lifting movable deck 6 from the first position to the second position. Even if this structure is adopted, take-up devices for taking up the ropes (not shown) connected at one end to hooks 222 and 224 of automobile B, respectively, can be provided near the left portions of longitudinal beams 66 and 68.

As has been described above, wheels 62 and 64 are provided at the left end portion (FIG. 1) of longitudinal beams 12 and 14. Instead, the right end portions (FIG. 1) of longitudinal beams 12 and 14 can be bent upwardly away from plane G, and wheels 62 and 64 can be provided on the lower surfaces of these bent end portions of beams 12 and 14. Further, two wheels 62 can be provided at both ends of longitudinal beam 12, and two wheels 64 can be provided at both ends of longitudinal beam 14, whereby either the left or right end portion of base 4, whichever desired, can be lifted by the forklift truck, thereby to move apparatus 2.

Figure 41:
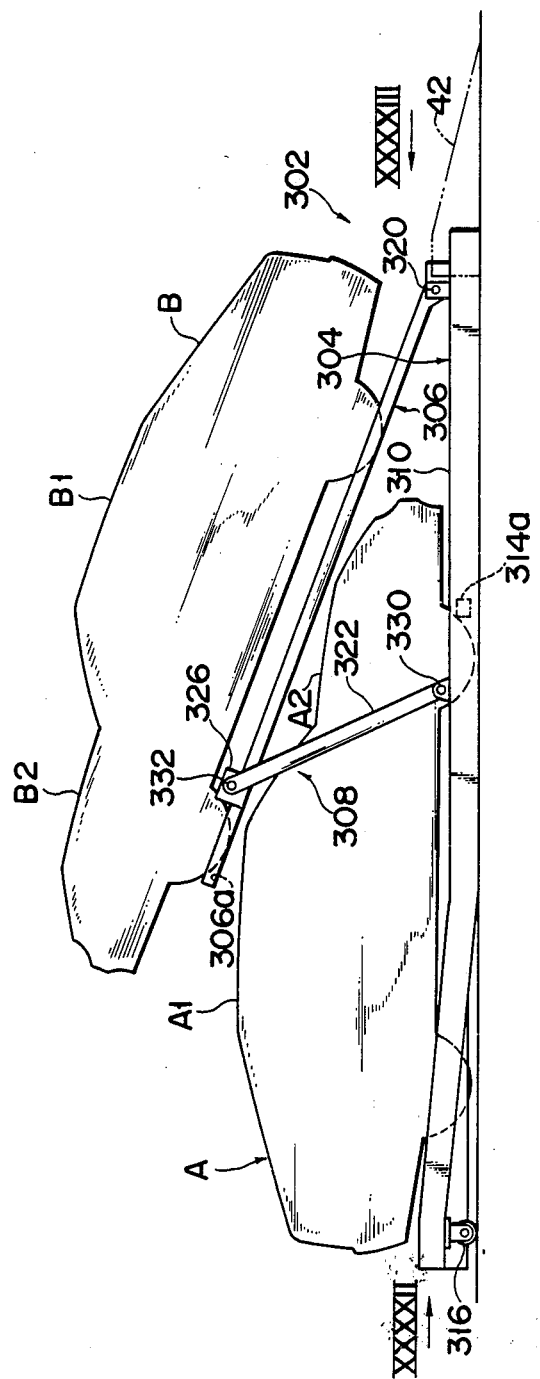
FIG. 41 is a front view of another embodiment of the invention.
Figure 42:
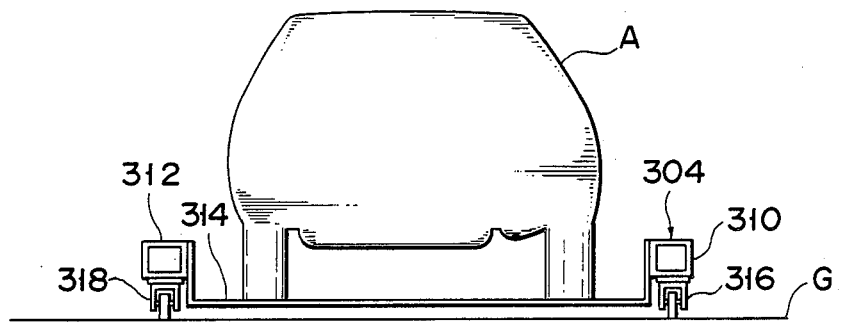
FIG. 42 shows this embodiment as viewed in the direction of arrow XXXXII (FIG. 41).
Figure 43:
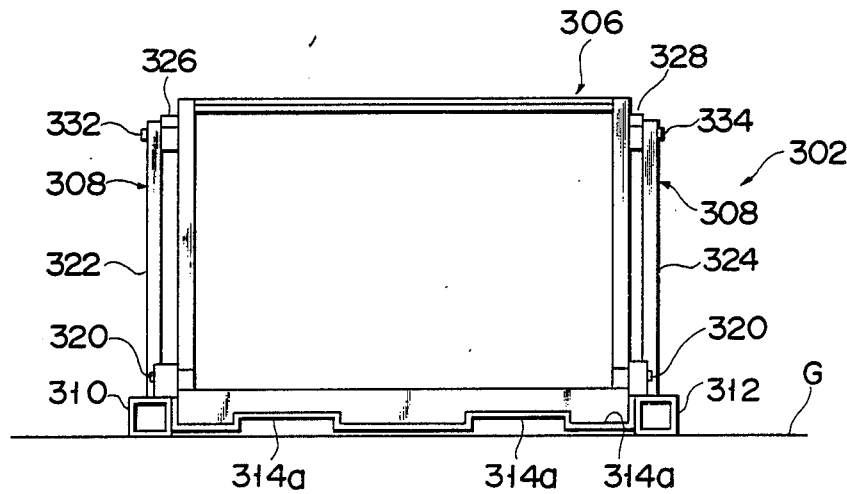
FIG. 43 also shows this embodiment as seen in the direction of arrow XXXXIII (FIG. 41).

FIGS. 1 to 46 show another embodiment of the present invention. In FIGS. 41 and 46, numeral 302 represents the loading apparatus according to this embodiment. Loading apparatus 302 comprises base 304, movable deck 306, and holding device 308.

Base 304 is in the form of a flat plate. Base 304 will be placed on the floor of a container (later described). First automobile A will be mounted on base 304 in a substantially horizontal position. Base 304 has two longitudinal beams 310 and 312 extending in the lengthwise direction of base 304, and plate member 314 bridging longitudinal beams 310 and 312. Longitudinal beams 310 and 312 have their lower surfaces located in plane G, except for one end portion which is bent upwardly away from plane G. Castors 316 and 318 are attached to the lower surfaces of these end portions. When base 304 is placed in plane G, castors 316 and 318 touch plane G or are slightly off plane G. When the other end portion (i.e., the right end) of base 304 is lifted a little (for example, 100 mm) from plane G, only castors 316 and 318 contacts plane G, and any part of the lower surfaces of longitudinal beams 310 and 312 does not touch plane G. Plate member 314 has engagement section 314a (i.e., the right end portion, in FIG. 41). Engagement section 314a will engage with the fork of a forklift truck or the like, when the right end portion of apparatus 302 is lifted.

Movable deck 306 is rotatably supported by base 304, with its lower end coupled by shaft 320 to longitudinal beams 310 and 312 of base 304. Deck 306 can move between the first position (FIG. 45) where it is laid upon base 304, and the second position (FIG. 41) where it extends substantially parallel to, and arranged close to, the plane including the front edge of roof panel A1 of automobile A and the front edge of bonnet A2 thereof. Movable deck 306 is shaped like a flat plate. When deck 306 remains in the second position, second automobile B can be mounted on deck 306, with its bonnet B2 located at a lever higher than its rear.

Figure 44:
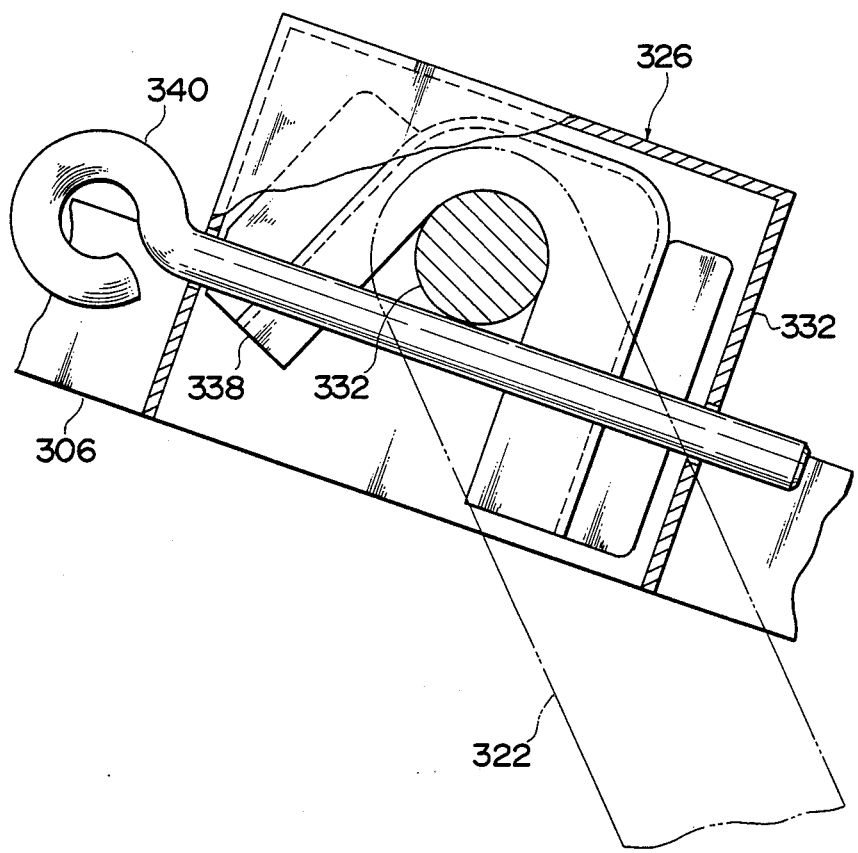
FIG. 44 is an enlarged, sectional view of stopper mechanism 326 shown in FIG. 41.

Holding device 308 has support rods 322 and 324, and coupling mechanisms 326 and 328. Support rods 322 and 324 have their lower end portions rotatably connected by shafts 330 to longitudinal beams 310 and 312 of base 304. Support rods 322 and 324 can rotate between a non-use position (FIG. 45) where they are laid upon longitudinal beams 310 and 312, and a use position (FIG. 41) where they engage with movable deck 306 and hold deck 306 in the second position. Stopper pins 332 and 334 are provided on the upper ends of support rods 322 and 324. These pins 332 and 334 are engaged with coupling mechanisms 326 and 328. Coupling mechanisms 326 and 328 have the same structure, and only coupling mechanism 326 will now be described (FIG. 44).

Coupling mechanism 326 has box-shaped base member 336 secured to movable deck 306 by welding or the like, pin-holding member 338 fixed within member 336 by welding or a bolt (not shown) and having a recess opening on the lower surface for receiving stopper pin 332 of support rod 322, and rod 340 extending through base member 336 for preventing stopper pin 332 set in the recess of pin-holding member 338, from moving. Coupling mechanisms 326 and 328 can be replaced by any mechanism that can couple the upper end portions of support rods 322 and 324 to movable deck 306.

The function of loading apparatus 302 of the structure described above will now be explained.

First it will be explained how to use loading apparatus 302. First, movable deck 306 is moved up by hands from the first position (FIG. 45), and stopper pins 332 and 334 of support rods 322 and 324 are engaged with coupling mechanisms 326 and 328. Movable deck 306 is thereby held in the second position (FIG. 41). First automobile A is driven from the left (FIG. 1) onto plate member 314 of base 304. Automobile A is mounted on base 4 such that the front edge of roof panel A1 and the front edge of bonnet A2 are positioned close to the lower surface of movable deck 306. Thereafter, second automobile B is driven from the right (FIG. 41), first onto inclined plate 42, connected to the right end of base 304, and then onto movable deck 306. Finally, both automobiles A and B are anchored to base 304 movable deck 306, respectively, by means of anchoring devices (not shown).

After two automobiles A and B have been mounted on loading apparatus 2, inclined plate 42 is disconnected from base 304. The right end portion of base 304 is lifted about 100 mm by a forklift truck or the like, thereby moving the lower surface of base 304 from plane G. In this condition, the forklift truck or the like is driven forward, thus moving loading apparatus 302, and thus automobiles A and B, into container C. Apparatus 302 is then anchored to the floor of container C by an anchoring device (not shown). If necessary, an inclined plate (not shown) is used, providing a slope between plane G and the floor of container C. Further, guide rails for guiding castors 316 and 318 can be laid on the floor of container C, if necessary.

This embodiment has the following advantages. When movable deck 306 is in the second position, second automobile B is mounted on deck 306, with its bonnet B2 located at a level higher than the rear of automobile B. Therefore, first and second automobiles A and B partly overlap. Since movable deck 306 located in the second position is substantially parallel to, and close to, the plane including the frond edge of roof panel A1 of first automobile A and the front edge of bonnet A2 thereof, the plane including the front edge of roof panel B1 of second automobile B and the front edge of bonnet B2 thereof is positioned substantially horizontal. In addition, the total height of first automobile A and second automobile B is much smaller than the sum of the height of automobile A and that of automobile B. Further, the total length of both automobiles A and B mounted on apparatus 302 is far shorter than the sum of the length of automobile A and that of automobile B. Since the total height and length of automobiles mounted on apparatus 302 are minimized, both automobiles can be loaded in container C, leaving only an extremely small dead space.

Figure 45:
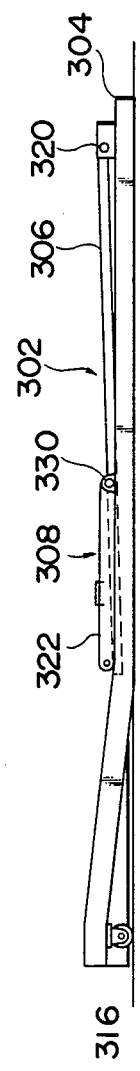
FIG. 45 is a front view of loading apparatus 302 (FIG. 41) in non-use condition.
Figure 46:
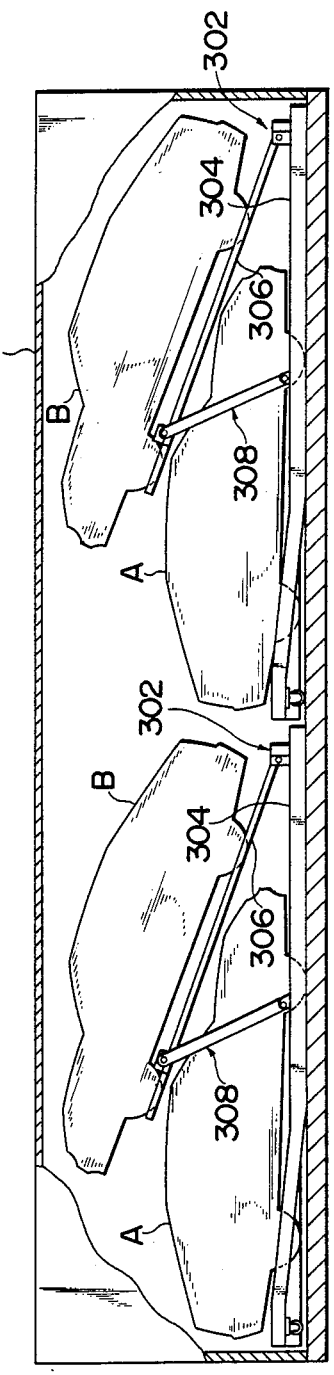
FIG. 46 is a diagram showing loading apparatuses 302 (FIG. 41) loaded in container C.

Moreover, when loading apparatus 302 is not used, it can be folded very compact by, as is shown in FIG. 45, laying movable deck 306 and support rods 322 and 324 upon base 304. Therefore, loading apparatus 302 can be transported with a high space-efficiency.

Still further, since automobile A has its front facing movable deck 306, and automobile B has its front positioned at a level higher than its rear, both automobiles A and B can be driven forward onto loading apparatus 302. In other words, automobiles A and B need not be driven backward to be mounted on loading apparatus 302. Therefore, they can very easily be mounted on loading apparatus 302.

Furthermore, no device is required to prevent loading apparatus 302 from moving since the lower surfaces of both longitudinal beams 310 and 312 of base 304 completely contact plane G when automobiles A and B are mounted on loading apparatus 302. In addition, in order to load apparatus 302 into container C, it suffices to slightly lift the right end portion (FIG. 41) of base 304 by a vehicle capable of doing so, thus moving up the lower surface of base 304 from plane G, and to drive the vehicle toward container C. Both automobiles A and B, mounted on loading apparatus 302, can thereby be loaded into container C. Hence, loading apparatus 302 can be easily and quickly loaded into container C.

Container C shown in FIG. 46 has such a size that two loading apparatuses 302, and hence, four automobiles, can be loaded in it. Needless to say, the loading apparatus of the present invention can be applied when automobiles are loaded into containers for loading one automobile each.

In the embodiment described above, movable deck 306 is moved by hands to the second position. Instead, movable deck 306 can be moved by an expansion/contraction mechanism, such as a hydraulic jack or an electric jack, provided between base 304 and movable deck 306. When such an expansion/contraction mechanism is employed, and this mechanism is equipped with a lock mechanism, coupling mechanisms 326 and 328 can, of course, be despensed with. Further, if the expansion/contraction mechanism has a great power, it will be possible to mount automobile B on movable deck 306 set in the first position (FIG. 45), then move deck 306 to the second position (FIG. 41) by means of the expansion/contraction meachanism, and finally mount automobile A on base 304.

In the embodiment described above, inclined plate 342 is used in order to mount second automobile B on movable deck 306. Nonetheless, second automobile B can be mounted on he loading apparatus if the lower edge of movable deck 306 is moved close to the upper surface of plate member 314 of base 304, thereby reducing the step.

Furthermore, stopper 306a, which contacts the front wheels of automobile B, can be provided on the supper end portion of movable deck 306. Moreover, if the size of automobile A is known, stopper 306a can be provided on base 304 such that automobile A is stopped in a prescribed position on base 304. These measures, if taken, will make it easy to mount automobiles A and B on loading apparatus 302.

INDUSTRIAL APPLICABILITY

As has been described above, it is possible with the present invention to load two automobiles, one upon the other. Therefore, the space within a container for transporting automobiles can be efficiently used. This helps to much reduce the cost of transporting automobiles. Further, the loading apparatus according to this invention can easily load automobiles, with a high efficiency. In addition, the loading apparatus of the invention can be folded when not used. Hence, it can be stored or transported, with a high space-efficiency.

We claim:

1. A double-decked apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end of said base, and able to be positioned in a first position, wherein said movable deck substantially overlaps said base, and rotatable upwardly by external force means from the first position to a second position, where said movable deck is located above the motor vehicle positioned on said base; and at least one support rod interposed between said base and said movable deck for holding said movable deck in the second position, said base having a contact surface for contacting a surface on which it is placed, and wheels at both end portions of said base, said wheels being designed so as not to bear said base on said surface when said base is placed on a flat surface, to thereby maintain a sufficient reaction applied from said surface to said contact surface, and said base having first engagement sections formed on both end portions of said base, for engagement by a lifting device when the lifting device is used to lift one end portion of said base, when one end portion of said base is raised slightly above said surface to thereby move said contact surface away from said surface, and said wheels at the other end portion of the base contact with said surface.

2. A double-decked apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end o said base, and able to be positioned in a first position, wherein said movable deck substantially overlaps said base, and rotatable upwardly by external force means from the first position to a second position, wherein said movable deck is located above the automobile positioned on said base, and at least one support rod interposed between said base and said movable deck for holding said movable deck in the second position, said support rod being rotatably connected, at one end to said base, and able to rotate by external force means around an axis extending in the widthwise direction of said base, and able to move to a non-use position extending along said base, and to a use position where the support rod is connected at the other end to said movable deck by means of at least one coupling mechanism, to thereby hold said movable deck in said second position, and said coupling mechanism having a shaft member which detachably penetrates the other end of said support rod and an engagement section formed on said movable deck.

3. The double-decked apparatus for loading motor vehicle into a container according to claim 2, wherein said engagement section of said coupling mechanism has a plurality of through holes in which said shaft member can be inserted, to thereby adjust the angle at which said movable deck, located in said second position, is inclined in relation to said base.

4. A double-decked apparatus for loading motor vehicles into a container, said apparatus comprising: a base within the container, and on which a motor vehicle can be placed in a substantially horizontal position; a movable deck adapted to have a motor vehicle releasably secured thereon and rotatably connected at one end to one end of said base, and able to be positioned in a first position, where said movable deck substantially overlaps said base, and rotatable upwardly by external force means from the first position to a second position, where said movable deck is located above the motor vehicle positioned on said base; and at least one support rod interposed between said base and said movable deck for holding said movable deck in the second position, said support rod being rotatably connected, at one end, to said movable deck, and able to rotate by external force means around an axis extending in the widthwise direction of said movable deck, said support rod adapted to move to a non-use position extending along said movable deck, and to a use position where the support rod is connected at the other end to said base by at least one coupling mechanism, to thereby hold said movable deck in said second position, and wherein each of said coupling mechanisms has a shaft member which detachably penetrates the other end of said support rod and an engagement section formed on said base.

5. The double-decked apparatus for loading motor vehicles into a container according to claim 4, further comprising at least one stopper on said base, for abutting against the other end of said support rod when said support rod is in said use position, to thereby prevent said movable deck from lowering.

6. The double-decked apparatus for loading motor vehicles into a container according to claim 4, wherein said engagement section of said coupling mechanism has a plurality of through holes in which said shaft member can be inserted, to thereby adjust the angle at which said movable deck, located in said second position, is inclined in relation to said base.

7. The double-decked apparatus for loading motor vehicles into a container accordingly to claim 6, wherein said shaft member has an axis extending in the widthwise direction of said base, each of the end portions of said support rods having an outer periphery curved in an arc, the center of which is the hole in which said shaft member is inserted, whereby the holes of said engagement section are arranged at the same level above said base.

8. The double-decked apparatus for loading motor vehicles into a container according to claim 4, wherein said engagement section of said coupling mechanism has two opposed plate members protruding from said base and arranged at both sides of the other end portion of said support rod located in the use position; and said shaft member being adapted to penetrate both of said plate members.

9. The double-decked apparatus for loading motor vehicles into a container according to claim 8, wherein said plate members are flanges extending upwardly from the edges of a plate fixed to said base.

10. A double-decked apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end of said base, and able to be positioned in a first position, wherein said movable deck substantially overlaps said base, and rotatable upwardly by external force means from the first position to a second position, wherein said movable deck is located above the motor vehicle positioned on said base; and at least one support rod interposed between said base and said movable deck for holding said movable deck in the second position, said support rod being rotatably connected at one end to said movable deck, and able to rotate by external force means around and axis extending in the widthwise direction of said movable deck, said support rod being able to move to a non-use position extending along said movable deck, and to a use position where the support rod is connected at the other end to said base by means of at least one coupling mechanism, to thereby hold said movable deck in said second position, said coupling mechanism having a stopper, said stopper provided on said base and abutting against the other end of said support rod when said support rod is in said use position, to thereby prevent said movable deck from lowering, and wherein the position of said stopper of said coupling mechanism is adjustable with respect to said base, to thereby adjust the angle at which said movable deck, located in said second position, is inclined in relation to said base.

11. A double-decked apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end of said base, and able to be positioned in a first position, wherein said movable deck substantially overlaps said base, and rotatable upwardly by external force means from the first position to a second position, wherein said movable deck is located above the motor vehicle positioned on said base; and at least one support rod interposed between said base and said movable deck for holding said movable deck in the second position, said support rod being rotatably connected at one end to said movable deck, and able to rotate by external force means around an axis extending in the widthwise direction of said movable deck, said support rod being able to move to a non-use position extending along said movable deck, and to a use position where the support rod is connected at the other end to said base by means of at least one coupling mechanism, to thereby hold said movable deck in said second position, and said coupling mechanism comprising a plurality of stoppers, said stoppers provided on said base and abutting against the other end of said support rod when said support rod is in said use position, to thereby prevent said movable deck from lowering, said stoppers adapted to adjust the angle at which said movable deck, located in said second position, is inclined in relation to said base.

12. A double-decked apparatus for loading motor vehicles into a container, said apparatus comprising: a base within the container, and on which a motor vehicle can be placed in a substantially horizontal position; a movable deck adapted to have a motor vehicle releasably secured thereon and rotatably connected at one end to one end of said base, and able to be positioned in a first position, wherein said movable deck substantially overlaps said base, and rotatable upwardly by external force means from the first position to a second position, where said movable deck is located above the motor vehicle positioned on said base; and at least one support rod interposed between said base and said movable deck, for holding said movable deck in the second position, said support rod being rotatably connected at one end to said movable deck, and able to rotate by external force means around an axis extending in the widthwise direction of said movable deck, said support rod being able to move to a non-use position extending along said movable deck, and to a use position where the support rod is connected at the other end to said base by at least one coupling mechanism, to thereby hold said movable deck in said second position, and said coupling mechanism having a stopper, said stopper provided on said base and abutting against the other end of said support rod when said support rod is in said use position, to thereby prevent said movable deck from lowering, said coupling mechanism having means for preventing said movable deck from rising from said second position, and said means for preventing said movable deck from rising having a take-up device attached to one of said base and said movable deck, and wire means taken up by said take-up device, the distal end of said wire means being connected to the other end of said base and said movable deck.

13. A double-deck apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end of said base, and able to be positioned in a first position, where said movable deck substantially overlaps said base, and rotatable upwardly by external force means, from the first position to a second position, wherein said movable deck is located above the motor vehicle positioned on said base; and at least one support rod interposed between said base and said movable deck for holding said movable deck in the second position, said support rod being rotatably connected at one end to said movable deck, and able to rotate by external force means around an axis extending in the widthwise direction of said movable deck, said support rod being able to move to a non-use position extending along said movable deck, and to a use position where the support rod is connected at the other end to said base by at least one coupling mechanism, to thereby hold said movable deck in said second position, and said base is designed such that the other end of said support rod slides on said base as said movable deck rises from said first position to said second position, and at least one safety stopper is provided in the path along which the other end of said support rod slides on said base, to allow the other end of said support rod to move when said movable deck rises from said first position to said second position, and for preventing the other end of said support rod from moving when said movable deck moves downward from said second position to said first position, to thereby prevent said movable deck from moving further downwardly.

14. A double-decked apparatus for loading motor vehicles into a container, said apparatus comprising: a base placed within the container, and on which a motor vehicle can be placed in a substantially horizontal position; a movable deck adapted to have a motor vehicle releasably secured thereon and rotatably connected at one end to one end of said base, and able to be positioned in a first position, wherein said movable deck substantially overlaps said base, and rotatable upwardly by external force means from the first position to a second position, wherein said movable deck is located above the motor vehicle positioned on said base; and at least one support rod interposed between said base and said movable deck for holding said movable deck in the second position;

said support rod being rotatably connected at one end to said movable deck, and able to rotate by external force means around an axis extending in the widthwise direction of said movable deck, said support rod being able to move to a non-use position extending along said movable deck, and to a use position where the support rod is connected at the other end to said base by at least one coupling mechanism, to thereby hold said movable deck in said second position, engagement means for holding said support rod in said non-use position on said movable deck, said engagement means having a projection formed on one of said movable deck and said support rod, and a hook lever formed on the other of said movable deck and said support rod, and capable of engaging said projection, and said hook lever remaining suspended by its own weight while in a free state, said projection abutting against said hook lever when said support rod is moved from said use position to said non-use position, thereby tilting said hook lever; and said hook lever returning to the suspended state use its own weight after said support rod moves beyond the hook portion of said hook lever, thereby engaging said projection.

15. The double-decked apparatus for loading motor vehicles into a container according to claim 14, wherein said support rod contacts said base before contacting said movable deck, when said movable deck is moved from said second position to said first position, with said support rod held in said non-use position due to the engagement of said hook lever and said projection; said support rod is thereby located above said non-use position with respect to said movable deck when said movable deck remains in said first position; and when said hook lever is in the suspended state it is unable to engage said projection when said movable deck is located near said first position.

* * * * *